United States Patent
Muller

(10) Patent No.: US 12,518,888 B2
(45) Date of Patent: Jan. 6, 2026

(54) HAZARDOUS WASTE DISPOSAL USING SALT

(71) Applicant: Deep Isolation, Inc., Berkeley, CA (US)

(72) Inventor: Richard A. Muller, Berkeley, CA (US)

(73) Assignee: Deep Isolation, Inc., Berkeley, CA (US)

( * ) Notice: Subject to any disclaimer, the term of this patent is extended or adjusted under 35 U.S.C. 154(b) by 172 days.

(21) Appl. No.: 18/476,708

(22) Filed: Sep. 28, 2023

(65) Prior Publication Data

US 2024/0105353 A1 Mar. 28, 2024

Related U.S. Application Data

(60) Provisional application No. 63/423,216, filed on Nov. 7, 2022, provisional application No. 63/410,708, filed on Sep. 28, 2022.

(51) Int. Cl.
*G21F 9/34* (2006.01)
*G21F 9/24* (2006.01)
*G21F 9/30* (2006.01)

(52) U.S. Cl.
CPC .................. *G21F 9/34* (2013.01); *G21F 9/24* (2013.01); *G21F 9/304* (2013.01)

(58) Field of Classification Search
CPC ... G21F 9/34; G21F 9/24; G21F 9/304; B09B 1/008
See application file for complete search history.

(56) References Cited

U.S. PATENT DOCUMENTS

| | | | |
|---|---|---|---|
| 3,379,013 A | 4/1968 | Slagle et al. | |
| 3,899,631 A | 8/1975 | Clark | |
| 4,316,814 A * | 2/1982 | Uerpmann | E21B 33/1208 405/129.45 |
| 4,428,700 A * | 1/1984 | Lennemann | G21F 9/36 976/DIG. 395 |

(Continued)

FOREIGN PATENT DOCUMENTS

| CN | 1973339 A | 5/2007 |
|---|---|---|
| CN | 101124640 A | 2/2008 |

(Continued)

OTHER PUBLICATIONS

[No Author Listed], "Yucca Mountain cost estimate rises to $96 billion," World Nuclear News, Aug. 6, 2008, 2 pages.

(Continued)

*Primary Examiner* — Janine M Kreck
(74) *Attorney, Agent, or Firm* — Fish & Richardson P.C.

(57) ABSTRACT

A hazardous material storage repository includes a borehole that extends into the Earth from a terranean surface. The borehole includes an entry and a hazardous material storage borehole portion formed in a subterranean salt formation. The repository includes a storage canister positioned in the hazardous material storage borehole portion. The storage canister is sized to fit from the entry through a substantially vertical borehole portion of the borehole, and into the hazardous material storage borehole portion. The storage canister includes an inner cavity sized to enclose nuclear waste material that includes TRansUranic waste.

20 Claims, 10 Drawing Sheets

(56) References Cited

U.S. PATENT DOCUMENTS

| | | | |
|---|---|---|---|
| 4,509,777 A * | 4/1985 | Walker | E21B 17/042 285/334 |
| 4,708,522 A | 11/1987 | Bergman et al. | |
| 4,886,393 A | 12/1989 | Jahn-Held et al. | |
| 5,133,624 A | 7/1992 | Cahill | |
| 5,165,235 A | 11/1992 | Nitschke | |
| 5,202,522 A | 4/1993 | Williams | |
| 5,318,382 A | 6/1994 | Cahill | |
| 5,340,235 A | 8/1994 | Milliken | |
| 5,377,104 A | 12/1994 | Sorrells et al. | |
| 5,387,741 A | 2/1995 | Shuttle | |
| 5,489,739 A | 2/1996 | Curry et al. | |
| 5,589,603 A | 12/1996 | Alexander et al. | |
| 5,785,133 A | 7/1998 | Murray et al. | |
| 5,850,614 A * | 12/1998 | Crichlow | G21F 9/34 588/259 |
| 5,863,283 A * | 1/1999 | Gardes | B09B 1/008 588/259 |
| 5,868,210 A | 2/1999 | Johnson et al. | |
| 6,002,063 A | 12/1999 | Bilak et al. | |
| 6,238,138 B1 | 5/2001 | Crichlow | |
| 7,068,748 B2 | 6/2006 | Singh | |
| 7,287,934 B2 | 10/2007 | Okutsu et al. | |
| 8,933,289 B2 | 1/2015 | Crichlow | |
| 9,852,822 B2 | 12/2017 | Singh | |
| 10,002,683 B2 | 6/2018 | Muller et al. | |
| 10,265,743 B1 | 4/2019 | Muller et al. | |
| 10,300,512 B2 | 5/2019 | Muller et al. | |
| 10,315,238 B1 | 6/2019 | Muller et al. | |
| 10,446,287 B2 | 10/2019 | Singh | |
| 10,614,927 B2 | 4/2020 | Muller et al. | |
| 10,861,614 B2 | 12/2020 | Muller et al. | |
| 10,926,306 B2 | 2/2021 | Muller et al. | |
| 11,135,629 B2 | 10/2021 | Muller et al. | |
| 11,338,337 B2 | 5/2022 | Muller et al. | |
| 2002/0020528 A1 | 2/2002 | McCabe et al. | |
| 2005/0207525 A1 | 9/2005 | Singh | |
| 2008/0039673 A1 | 2/2008 | Maksimov | |
| 2008/0308271 A1 | 12/2008 | Chouzenoux et al. | |
| 2009/0135986 A1 | 5/2009 | Georgii | |
| 2010/0105975 A1 | 4/2010 | Baird | |
| 2010/0234663 A1 | 9/2010 | Crichlow | |
| 2011/0005762 A1 | 1/2011 | Poole | |
| 2011/0054234 A1 | 3/2011 | Georgii | |
| 2014/0221722 A1 | 8/2014 | Germanovich et al. | |
| 2016/0258226 A1 | 9/2016 | Clemens et al. | |
| 2017/0186505 A1 | 6/2017 | Muller et al. | |
| 2018/0144841 A1 | 5/2018 | Singh | |
| 2018/0345336 A1 | 12/2018 | Muller et al. | |
| 2019/0099790 A1 | 4/2019 | Muller et al. | |
| 2019/0318838 A1 | 10/2019 | Muller et al. | |
| 2020/0023416 A1 | 1/2020 | Muller et al. | |
| 2020/0211727 A1 | 7/2020 | Muller et al. | |
| 2022/0080481 A1 | 3/2022 | Muller et al. | |

FOREIGN PATENT DOCUMENTS

| | | |
|---|---|---|
| CN | 101971268 A | 2/2011 |
| CN | 106782735 A | 5/2017 |
| GB | 2104713 A | 3/1983 |
| GB | 2151839 A | 7/1985 |
| GB | 2161015 A | 1/1986 |
| JP | S58-042945 A | 3/1983 |
| JP | 2000231000 A | 8/2000 |
| JP | 2003028991 A | 1/2003 |
| JP | 2005091070 A | 4/2005 |
| JP | 2005245261 A | 9/2005 |
| JP | 2006035068 A | 2/2006 |
| JP | 2006170690 A | 6/2006 |
| JP | 4902877 B2 | 1/2012 |
| TW | I484502 B | 5/2015 |
| WO | WO 1981001055 A1 | 4/1981 |
| WO | WO 1992007667 A1 | 5/1992 |
| WO | WO 2010007305 A2 | 1/2010 |
| WO | WO 2015069300 A1 | 5/2015 |
| WO | WO 2016177876 A1 | 11/2016 |
| WO | WO 2017112479 A1 | 6/2017 |

OTHER PUBLICATIONS

Arnold et al., "Reference Design and Operations of Deep Borehole Disposal of High-Level Radioactive Waste—- SAND2011-6749," Sandia National Laboratories, Oct. 2011, 67 pages.

Cornwall, "Deep Sleep. Boreholes drilled into Earth's crust get a fresh look for nuclear waste disposal," Science, Jul. 10, 2015, 349(6244):132-135.

Dozier, "Feasibility of Very Deep Borehole Disposal of US Nuclear Defense Wastes," Thesis for the degree of Master of Science in Nuclear Science and Engineering, Massachusetts Institute of Technology, Sep. 2011, 176 pages.

Faybishenko et al., "International Approaches for Deep Geological Disposal of Nuclear Waste: Geological Challenges in Radioactive Waste Isolation," Lawrence Berkeley National Laboratory and Sandia National Laboratories: prepared for the US Department of Energy, Fifth Worldwide Review, Dec. 2016, 474 pages.

Gibb et al., "A Model for Heat Flow in Deep Borehole Disposals of High-Level Nuclear Waste," Journal of Geophysical Research, May 6, 2008, 113(B5):1-18.

Gibbs, "Feasibility of Lateral Emplacement in Very Deep Borehole Disposal of High Level Nuclear Waste," Thesis for the degrees of Naval Engineering and Nuclear Engineering, Massachusetts Institute of Technology, Jun. 2010, 154 pages.

Hoag, "Canister Design for Deep Borehole Disposal of Nuclear Waste," Thesis for the degree of Master of Science in Nuclear Science and Engineering, Massachusetts Institute of Technology, May 2006, 125 pages.

Hurd, "Choosing and Using A Form Release Agent," Concrete Construction, 1996, 41(10):732-736.

International Search Report and Written Opinion in International Application No. PCT/US2018/035974, mailed on Aug. 24, 2018, 13 pages.

International Search Report and Written Opinion issued in International Application No. PCT/US2016/066539, mailed on Apr. 19, 2017, 13 pages.

Latimes.com [online], "Decades-old war over Yucca Mountain nuclear dump resumes under Trump budget plan," Mar. 29, 2017, retrieved on Dec. 19, 2019, retrieved from URL<https://www.latimes.com/local/california/la-na-yucca-revival-20170329-story.html>, 4 pages.

Neuzil, "Can Shale Safely Host U.S. Nuclear Waste?" EOS, Jul. 23, 2013, 94(30):1-3.

Office Action in Chinese Appln. No. 2018-80049476, mailed Dec. 11, 2020, 9 pages (with English translation).

Office Action in Japanese Appln. No. 2018-552636, mailed Apr. 27, 2021, 7 pages (with English Translation).

Office Action in Korean Appln. No. 10-2020-7000246, mailed Dec. 14, 2021, 7 pages (with English Translation).

Office Action in Taiwanese Appln. No. 107119231, mailed Dec. 23, 2021, 109 pages (with English Translation).

Sone et al., "Mechanical properties of shale-gas reservoir rocks—Part 1: Static and dynamic elastic properties and anisotropy," Geophysics, Sep.-Oct. 2013, 78(5):D381-392.

Thebulletin.org [online], "Shale: An overlooked option for US nuclear waste disposal," Nov. 2014, retrieved on Aug. 23, 2018, retrieved from URL<http://thebulletin .org/shale-overlooked-option-US-nuclear-waste-disposal7831>, 5 pages.

Thomson, "Performance Confirmation Concepts Study Report," Civilian Radioactive Waste Management System Management & Operating Contractor TRW, Nov. 22, 1996, 331 pages.

U.S. Nuclear Waste Technical Review Board, "A Report to the U.S. Congress and the Secretary of Energy, Evaluation of Technical Issues Associated With the Development of a Separate Repository for U.S. Department of Energy-Managed High-Level Radioactive Waste and Spent Nuclear Fuel," NWTRB, 2015, available at URL: <http://www.nwtrb.gov/reports/disposal_options.pdf>, 30 pages.

(56) References Cited

OTHER PUBLICATIONS

United States Department of Energy, "Executive Summary—Environmental Impact Statement, Waste Isolation Pilot Plant (WIPP)," Oct. 1980, 1544 pages.

United States Department of Energy, "Quality Assurance Program Document, DOE/CBFO-94-1012 Revision 13," Carlsbad Field Office, Apr. 20, 2017, 127 pages.

United States Department of Energy, "Safety Evaluation Report Addendum for Annual Update of Waste Isolation Plant, Document Safety Analysis, Revision 6, and Technical Safety Requirements, Revision 6," mailed Feb. 26, 2018, 55 pages.

United States Department of Energy, "Safety Evaluation Report for Approval of DOE/WIPP 07-3372, Waste Isolation Plant Documented Safety Analysis, Revision 5 and DOE/WIPP 07-3373, Waste Isolation Pilot Plant Technical Safety Requirements, Revision 5," mailed Apr. 29, 2016, 235 pages.

United States Department of Energy, "Waste Isolation Pilot Plant, Environmental Monitoring Plan, Revision 10," mailed Jun. 22, 2017, 56 pages.

United States Department of Energy, "Waste Isolation Plant, Documented Safety Analysis," Nuclear Waste Partnership LLC Carlsbad, NM, mailed Feb. 2018, 777 pages.

United States Department of Energy, "Waste Isolation Plant, Final Supplement, Environmental Impact Statement," mailed Jan. 1990, 1498 pages.

United States Department of Energy, "Waste Isolation Plant, Final Technical Safety Requirements," Nuclear Waste Partnership LLC Carlsbad, NM, mailed Feb. 2018, 291 pages.

Winterle et al., "Regulatory Perspectives on Deep Borehole Disposal Concepts," prepared for the U.S. Nuclear Regulatory Commission, Contract NRC-02-07006, Center for Nuclear Waste Regulatory Analyses, San Antonio, TX, May 2011, 24 pages.

YuccaMountain.org [online], "Eureka County, Nevada—Nuclear Waste Office, FAQ," Mar. 17, 2017, retrieved on Dec. 17, 2019, retrieved from URL<https://www.yuccamountain.org/>, 12 pages.

\* cited by examiner

HAZARDOUS WASTE DISPOSAL USING SALT

CROSS-REFERENCE TO RELATED APPLICATIONS

This application claims priority under 35 U.S.C. § 119 to U.S. Provisional Patent Application Ser. No. 63/410,708, filed on Sep. 28, 2022, and U.S. Provisional Patent Application Ser. No. 63/423,216, filed on Nov. 7, 2022. The entire contents of both previous applications are incorporated by reference herein.

TECHNICAL FIELD

This disclosure relates to the permanent or temporary disposal of hazardous waste, such as radioactive waste, using salt as a storage component.

BACKGROUND

Hazardous waste is often placed in long-term, permanent, or semi-permanent storage so as to prevent health issues among a population living near the stored waste. Such hazardous waste storage is often challenging, for example, in terms of storage location identification and surety of containment. For instance, the safe storage of nuclear waste (e.g., spent nuclear fuel, whether from commercial power reactors, test reactors, or even military waste) is considered to be one of the outstanding challenges of energy technology. Safe storage of the long-lived radioactive waste is a major impediment to the adoption of nuclear power in the United States and around the world. Conventional waste storage methods have emphasized the use of tunnels, and is exemplified by the design of the *Yucca* Mountain storage facility. Other techniques include boreholes, including vertical boreholes, drilled into crystalline basement rock. Other conventional techniques include forming a tunnel with boreholes emanating from the walls of the tunnel in shallow formations to allow human access.

SUMMARY

In an example implementation, a hazardous material storage repository includes a borehole that extends into the Earth from a terranean surface. The borehole includes an entry at least proximate the terranean surface. The borehole includes a hazardous material storage borehole portion formed in a subterranean salt formation. The repository includes a storage canister positioned in the hazardous material storage borehole portion. The storage canister is sized to fit from the borehole entry through a substantially vertical borehole portion of the borehole, and into the hazardous material storage borehole portion of the borehole. The storage canister includes an inner cavity sized to enclose nuclear waste material that includes TRansUranic (TRU) waste. The repository includes a seal positioned in the borehole, the seal isolating the hazardous material storage borehole portion of the borehole from the entry of the borehole.

In an aspect combinable with the example implementation, the hazardous material storage borehole portion is between 1000 feet and 2500 feet below the terranean surface.

In another aspect combinable with any of the previous aspects, at least a portion of the borehole includes a diameter of at least 26 inches.

In another aspect combinable with any of the previous aspects, all of the borehole includes a diameter of at least 26 inches.

In another aspect combinable with any of the previous aspects, the borehole further includes a non-vertical borehole portion.

In another aspect combinable with any of the previous aspects, the non-vertical borehole portion includes a tilted, curved or horizontal borehole portion.

In another aspect combinable with any of the previous aspects, the borehole is uncased.

Another aspect combinable with any of the previous aspects further includes a casing installed in at least a portion of the borehole; and a cement layer installed adjacent the casing.

In another aspect combinable with any of the previous aspects, the casing includes a plurality of casing segments, each of the casing segments including a male beveled end and a female beveled end.

In another aspect combinable with any of the previous aspects, the storage canister is one of a plurality of storage canisters, each of the plurality of storage canisters positioned within a hardenable material placed in the hazardous material storage borehole portion.

In another aspect combinable with any of the previous aspects, the hardenable material includes cement or concrete.

In another aspect combinable with any of the previous aspects, the hardenable material is placed in the hazardous material storage borehole portion with one or more flexible enclosures.

Another aspect combinable with any of the previous aspects further includes a shelf formed within the borehole and sized to support a TRU waste container.

In another aspect combinable with any of the previous aspects, the shelf is formed at a depth below the terranean surface.

In another aspect combinable with any of the previous aspects, the shelf is formed adjacent the entry of the borehole.

Another aspect combinable with any of the previous aspects further includes an adjustable lid installed at a portion of the borehole adjacent the shelf.

In another aspect combinable with any of the previous aspects, the nuclear waste material is transferred from the TRU waste container supported on the shelf to the storage canister and into the entry of the borehole.

In another aspect combinable with any of the previous aspects, the storage canister includes a drum enclosed in the TRU waste container.

In another aspect combinable with any of the previous aspects, the seal is placed at the entry of the borehole.

In another aspect combinable with any of the previous aspects, the TRU waste includes remote handled TRU waste.

In another example implementation, a method for storing hazardous material includes identifying a hazardous material storage repository that includes a borehole that extends into the Earth from a terranean surface, the borehole including an entry at least proximate the terranean surface, the borehole including a hazardous material storage borehole portion formed in a subterranean salt formation; installing one or more storage canisters in the hazardous material storage repository, each of the one or more storage canisters sized to fit from the borehole entry through a substantially vertical borehole portion of the borehole, and into the hazardous material storage borehole portion of the borehole, the storage canister including an inner cavity sized to enclose nuclear waste material that includes TRansUranic (TRU) waste; and positioning a seal in the borehole to isolate the hazardous material storage borehole portion of the borehole from the entry of the borehole.

In an aspect combinable with the example implementation, the hazardous material storage borehole portion is between 1000 feet and 2500 feet below the terranean surface.

In another aspect combinable with any of the previous aspects, at least a portion of the borehole includes a diameter of at least 26 inches.

In another aspect combinable with any of the previous aspects, all of the borehole includes a diameter of at least 26 inches.

In another aspect combinable with any of the previous aspects, the borehole further includes a non-vertical borehole portion.

In another aspect combinable with any of the previous aspects, the non-vertical borehole portion includes a tilted, curved or horizontal borehole portion.

In another aspect combinable with any of the previous aspects, the borehole is uncased.

Another aspect combinable with any of the previous aspects further includes installing a casing in at least a portion of the borehole; and installing a cement layer adjacent the casing.

In another aspect combinable with any of the previous aspects, the casing includes a plurality of casing segments, each of the casing segments including a male beveled end and a female beveled end.

In another aspect combinable with any of the previous aspects, the storage canister is one of a plurality of storage canisters, each of the plurality of storage canisters positioned within a hardenable material placed in the hazardous material storage borehole portion.

In another aspect combinable with any of the previous aspects, the hardenable material includes cement or concrete.

Another aspect combinable with any of the previous aspects further includes placing the hardenable material in the hazardous material storage borehole portion with one or more flexible enclosures.

Another aspect combinable with any of the previous aspects further includes forming a shelf within the borehole and sized to support a TRU waste container.

In another aspect combinable with any of the previous aspects, the shelf is formed at a depth below the terranean surface.

In another aspect combinable with any of the previous aspects, the shelf is formed adjacent the entry of the borehole.

Another aspect combinable with any of the previous aspects further includes installing an adjustable lid at a portion of the borehole adjacent the shelf.

Another aspect combinable with any of the previous aspects further includes transferring the nuclear waste material from the TRU waste container supported on the shelf to the storage canister and into the entry of the borehole.

In another aspect combinable with any of the previous aspects, the storage canister includes a drum enclosed in the TRU waste container.

In another aspect combinable with any of the previous aspects, the seal is placed at the entry of the borehole.

In another aspect combinable with any of the previous aspects, the TRU waste includes remote handled TRU waste.

The details of one or more implementations of the subject matter described in this disclosure are set forth in the accompanying drawings and the description below. Other features, aspects, and advantages of the subject matter will become apparent from the description, the drawings, and the claims.

DETAILED DESCRIPTION

The present disclosure describes example implementations of methods and system for constructing and operating hazardous material storage repository, which includes one or more drillholes (e.g., boreholes or wellbores) formed into a subterranean zone to provide long-term (e.g., tens, hundreds, or even thousands of years) storage of hazardous material (e.g., biological, chemical, nuclear, or otherwise) in one or more underground storage volumes storage canisters. The subterranean zone can include one or more subterranean layers having different geological formations and properties; in some implementations, the subterranean zone is an underground salt formation. The storage canisters may be deposited in a particular subterranean layer based on one or more geologic properties of that layer.

Hazardous waste repositories that are considered to be "mined" facilities and facilitate the underground human-occupation of one or more portions of the facility exist around the world. For example, WIPP is the common name for the "Waste Isolation Pilot Plant," a U.S. government facility located near Carlsbad, New Mexico. WIPP is licensed to dispose of U.S. TRU (also called "TRansUranic") waste, comprised primarily of the uranium, plutonium, neptunium, and other transuranic radioisotopes. This waste was produced by the Department of Defense in the U.S. nuclear weapons program. Unlike commercial high-level waste, TRU waste was not proposed for disposal at Yucca Mountain (another human-occupiable, mined repository), but only at the WIPP facility.

Figure 1:
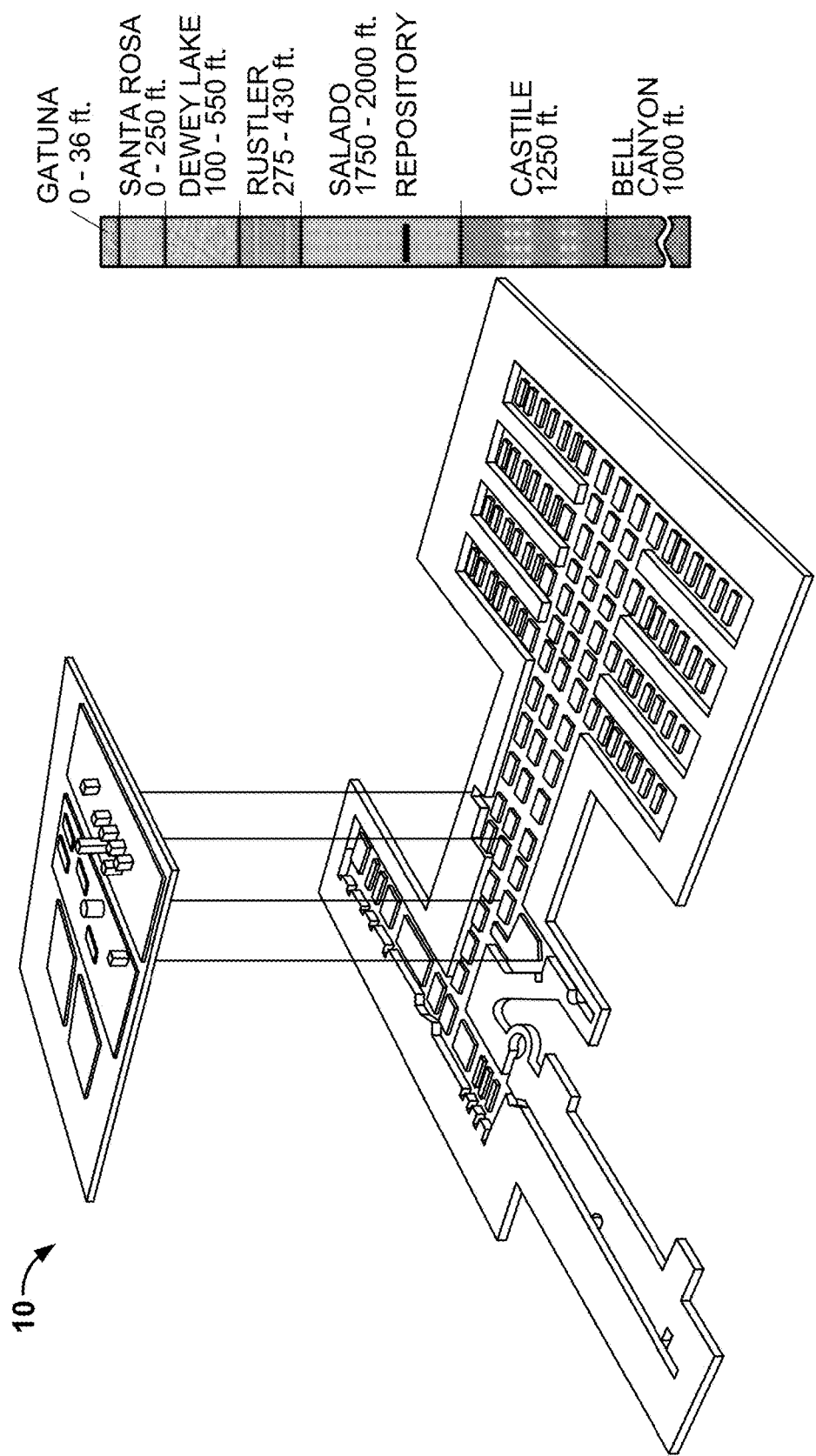
FIG. 1 is a schematic illustration of a diagram of the Waste Isolation Pilot Plant (WIPP), a U.S. government facility located near Carlsbad, New Mexico.

The WIPP repository consists of a series of tunnels dug at a depth of 2150 feet in the Salado salt formation. Access to these tunnels is by vertical shafts, typically 10 feet in diameter. Some of these access shafts have elevators so personnel, machines and waste can descend into the tunnels, and some of the shafts provide ventilation. A diagram of the WIPP facility 10 is shown in FIG. 1; facility 10, however, can also represent other mined facilities in which hazardous waste (such as radioactive waste) is stored. As indicated in the diagram of FIG. 1, not all of the tunnels have been excavated; new ones are mined as additional waste arrives. The geologic stratigraphy appears on the right. The Salado formation, in which the repository lies, was the result of salt left from the evaporation of a vast saline inland sea. The salt Salado formation that hosts the tunnels extends from depths of about 1000 feet to 2800 feet.

Facilities from around the U.S. ship their TRU waste to WIPP. The waste typically arrives in two kinds of canisters: those that allow close proximity of humans, called "contact handled" or "CH" waste, and those that emit dangerous levels of gamma radiation and/or neutrons, and are called "remote handled" waste, or "RH" waste. The RH canisters are 26 inches in diameter, and 10 feet long. RH canisters are those that would give a human standing beside one a dose of 100 mrem per hour, or larger.

Most of the waste at WIPP is CH waste. WIPP is limited by the U.S. Land Withdrawal Act to 175,570 cubic meters of waste, of which no more than 7,080 cubic meters can be RH waste, i.e., no more than 4%. About 300 to 400 canisters of RH waste are currently being delivered to WIPP every year for disposal. When RH waste arrives, it is stored above ground until enough has been collected to make it worthwhile to put in place. When this happens, much underground activity at WIPP is temporarily halted, and the more dangerous RH waste is brought down the shafts into the tunnels at a depth of 2150 feet.

As the diagram in FIG. 1 shows, above the Salado salt formation is the Rustler formation, and this formation, at typically 800 ft. depth, contains an aquifer (in the Culebra sub-formation). Safety considerations indicate that radioactive waste must be isolated from this aquifer. In the WIPP facility, isolation is achieved by the salt, which has extremely low permeability and sufficiently low diffusivity to inhibit motion of the waste radioisotopes. Waste radioisotopes could also reach the aquifer through one of the vertical access holes; safety is achieved by careful plugging of those holes. Those holes will be sealed with a special concrete designed for this site, a concrete that binds to the salt walls and itself has low permeability and diffusivity. In addition, it is expected that the tunnels and room in the WIPP facility will gradually close with time as the salt "creeps," that is, moves like a very viscous liquid.

In the WIPP tunnels, the RH waste is placed in special holes in the walls, using remote methods in order to keep personnel safe. As a result, the cost of placing RH waste is high. Based on the yearly budget of WIPP, the cost per canister is $370,000 to put into disposal at WIPP. This cost would be substantially lower if an alternative could be found for the RH waste.

A "separate" storage system or facility at WIPP has not previously been considered, because it appeared that such a facility would be prohibitively expensive. A facility such as WIPP requires several large entrance shafts, as shown in FIG. 1. These include shafts for ventilation, salt handling, and waste handling. Bolts must be placed in the ceilings of the tunnels and rooms to stabilize the shafts.

Figure 2:
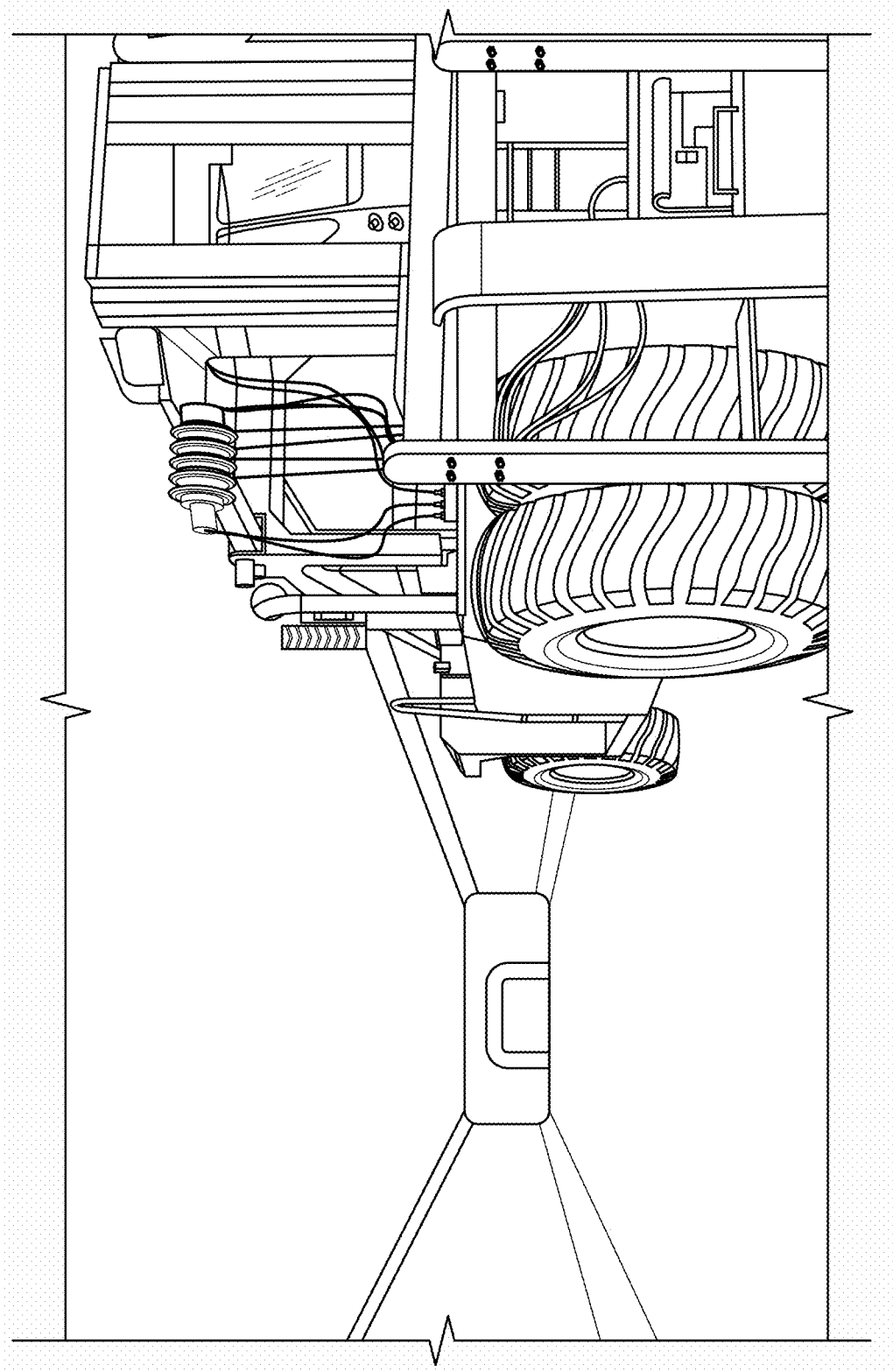
FIG. 2 is a photograph of a tractor within a tunnel of the WIPP.

FIG. 2 shows the WIPP tunnels and a tractor. A typical tunnel is 13 feet tall, 33 feet wide, and up to as 300 feet long. Note the bolts on the top surface to help slow the creep, and the netting to catch falling rocks. RH-TRU waste cannot be left in the open as new canisters are delivered; rather they must be placed in short disposal holes dug in the walls of the tunnels to give radiation isolation. Currently, the RH-TRU waste is stored in short horizontal holes made in the walls of the tunnels. These holes are short, in part, because machinery to drill long holes does not fit conveniently into the tunnels, and because there is enough wall space to accommodate the relatively small number of holes required for the small amount of RH-TRU waste. Making longer holes would make disposal more complex and difficult, so it is not done. Thus, to create a separate but identical facility dedicated to only the 4% of the waste designated as RH-TRU would be prohibitively expensive.

Figure 3:
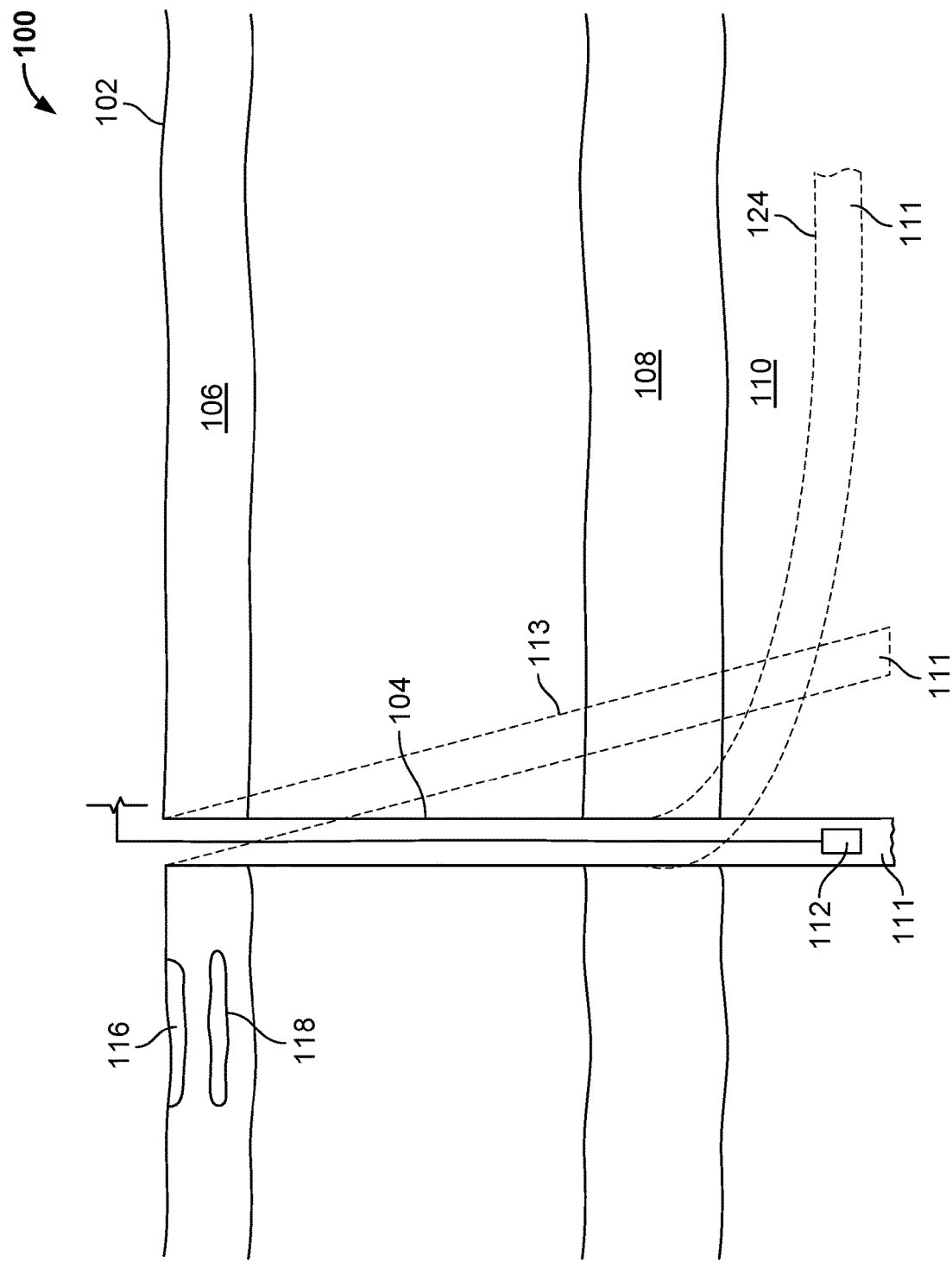
FIG. 3 is a schematic illustration of an example implementation of a hazardous material storage repository that includes one or more human-unoccupiable boreholes or wellbores formed from a terranean surface into a salt formation according to the present disclosure.

In an example inventive embodiment of the present disclosure shown in FIG. 3, a separate facility 100 for RH waste (separate from the existing underground facility) at WIPP (or any other location that includes an underground salt formation according to the present disclosure, including locations that do not include an existing mined repository) is described that includes one or more wellbores 104 (e.g., drillholes or boreholes) formed (e.g., drilled) from the Earth's surface 102 into the Salado formation 110 (or other salt formation). In some aspects, the wellbores 104 are only vertical (or substantially vertical taking into account slight offsets due to the drilling process). As shown in FIG. 3, the borehole 104 could be vertical, tilted, or have a gradually changing direction (such as horizontal portion 124 coupled to wellbore 104 through a curved portion).

Figure 4:
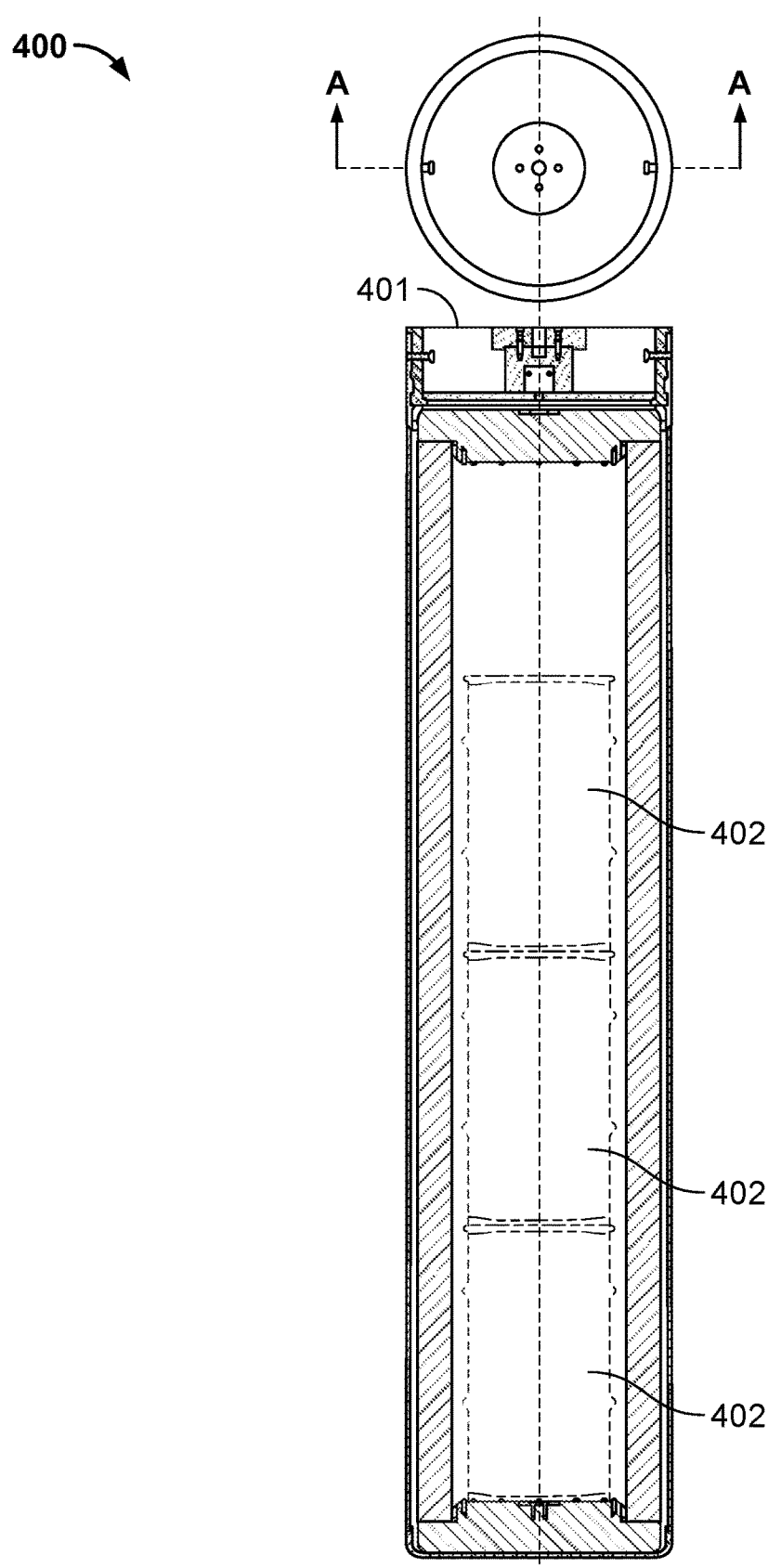
FIG. 4 is an illustration of a waste canister used to store radioactive waste at the WIPP.

In some aspects, the wellbores 104 include non-vertical portions 124, such as curved or horizontal (or substantially horizontal) portions that are coupled to vertical portions that extend into the Earth, through subterranean formations 106 and 108, from the surface 102, and into the salt formation 110. In some aspects, one or more formations, such as a surface formation 106, may include surface water 116 or sub-surface, mobile water 118. One or more canisters 112 (which can represent the container 400 or a drum 402 as shown in FIG. 4, or other form of waste container) containing RH waste is positioned in a storage portion 111 of the wellbores 104 that is located in the salt formation 110. In some aspects, all or a part of the wellbore 104 (such as a portion close to the surface 102) may be cased.

In some aspects, this "separate" facility 100 can be close to the current WIPP facility, for example even within the fence of the existing WIPP facility. There is plenty of room on this site. This location can expedite and simplify the licensing process, and that can save considerable cost. The facility 100 has no tunnels, no need for support bolts, no large access holes (only very narrow ones) and no need for humans or large vehicles underground during construction, placement, closure and sealing, or any operations of the repository. In place of tunnels, the wellbores 104 can be large enough in diameter to accommodate the RH-TRU canisters 112, which are 26-inches in diameter and 10 feet long.

In some aspects, the wellbores 104 can be long boreholes, such as 1000 to 2800 feet in length, or longer. In an example configuration, the wellbores are vertical, wide enough to accommodate individual RH-TRU canisters, and deep enough to store waste within the Salado formation. For example, U.S. regulatory organizations have already licensed disposal of RH-TRU waste in this geologic formation. By using the same formation (although offset from WIPP and not intersecting the existing or planned tunnels), the number of technical and safety issues that must be addressed to obtaining a regulatory license for disposal are significantly reduced.

There is a widespread misimpression in the field of waste disposal that large-diameter boreholes are technically challenging and very expensive. This expectation derives from the fact that large vertical boreholes have previously been considered for waste disposal in hard rock such as granite, basalt, or another crystalline basement rock, and have been very deep. The idea of a large-diameter borehole for nuclear waste disposal in a shallow (e.g., 2800 ft. or less) formation is not an approach that an expert practiced in the field of borehole disposal would consider as an obvious solution. But for drilling through a sedimentary overlayer, and then into salt, this prejudice is not correct.

The present disclosure also describes a canister transfer system that can be used, for example, with RH canisters at the facility 100. WIPP RH-TRU waste canisters can weigh as much as 8,000 pounds. Thus, there is a danger of the upper canisters installed in the borehole 104 (or other borehole) putting sufficient weight on the lower canisters to cause damage to the lower canisters (such as crush damage). FIG. 4 shows an example of the drums 402 which hold the waste and the container 400 in which three drums 402 sit. In FIG. 4, the waste is all confined to the 15-gallon drums 402 with diameters of 16 inches and lengths of 27 inches. Three such drums 402 are placed inside the container 400, which has a diameter of 26 inches. This container 400 is too large to be placed in most boreholes (such as borehole 104), but the drums 402 are conveniently sized, and can be enclosed within the container 400 when a lid 401 is sealed as shown in FIG. 4. The lid 401 can be opened and resealed to remove or enclose the drums 402.

Figure 5A:
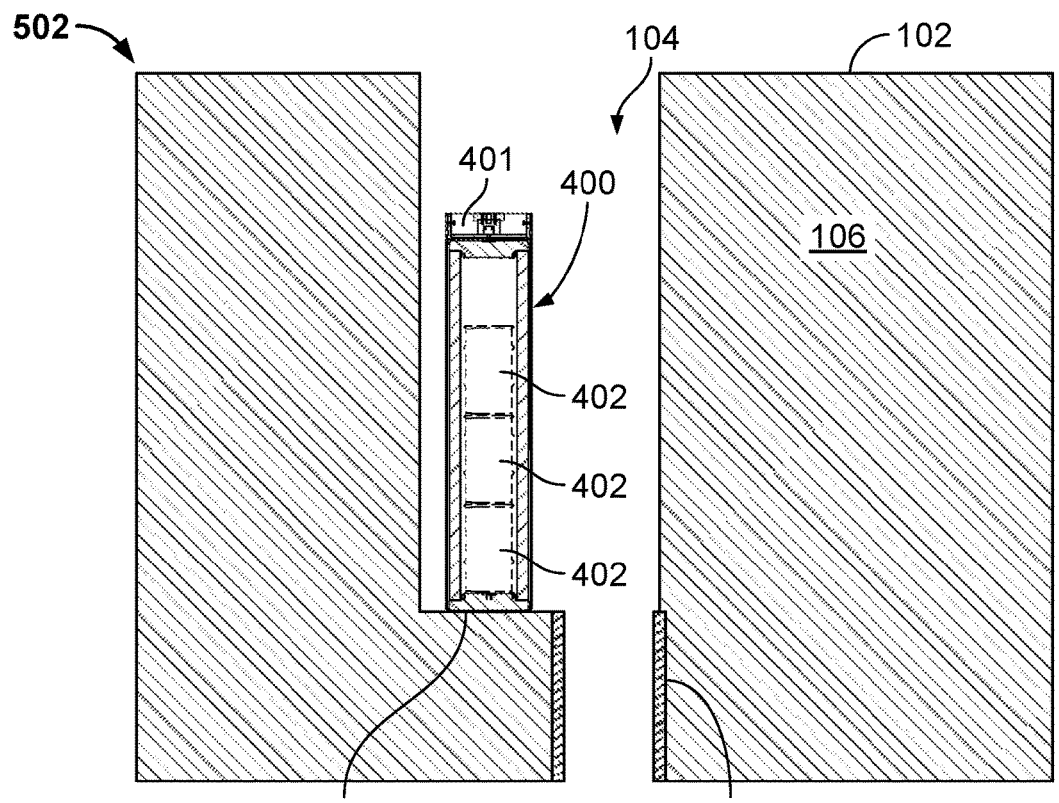
FIGS. 5A-5G show an example embodiment of a canister transfer system and method for storing hazardous waste in a hazardous material storage repository that includes one or more human-unoccupiable boreholes or wellbores formed from a terranean surface into a salt formation according to the present disclosure.

FIGS. 5A-5G show an example embodiment of a canister transfer system and method. FIG. 5A shows a step 502 in which the WIPP canister 400 is placed on a shelf 505 next to the borehole (for example, borehole 104). Since the canister 400 is underground, the radiation exposure to surface personnel is minimized; the main danger comes from radiation going upward (i.e., uphole toward the terranean surface 102). As shown in this figure, a casing 507 (such as a surface or conductor casing) is installed in the borehole 104 just downhole of the shelf 505. In this example, the shelf 505 is formed in the subterranean formation 106; but the shelf 505 can be formed (alternatively or additionally) in other subterranean formations as well.

Figure 5B:
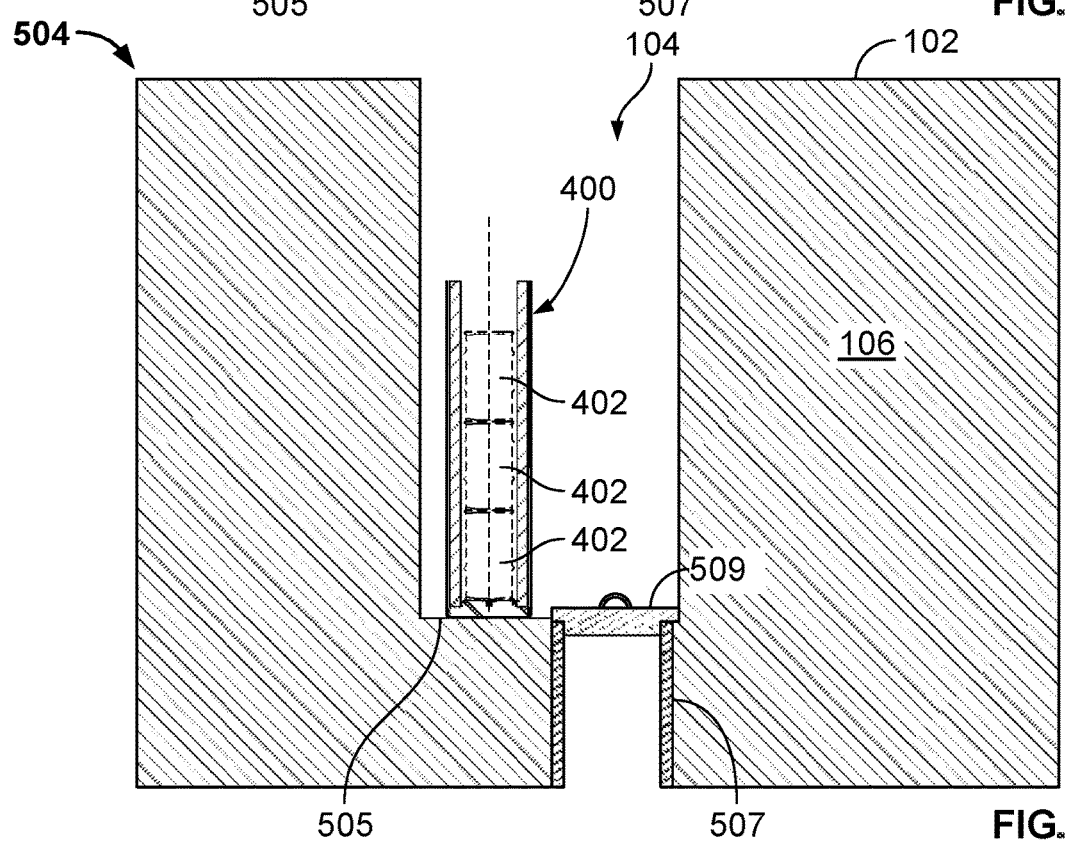
Figure 5C:
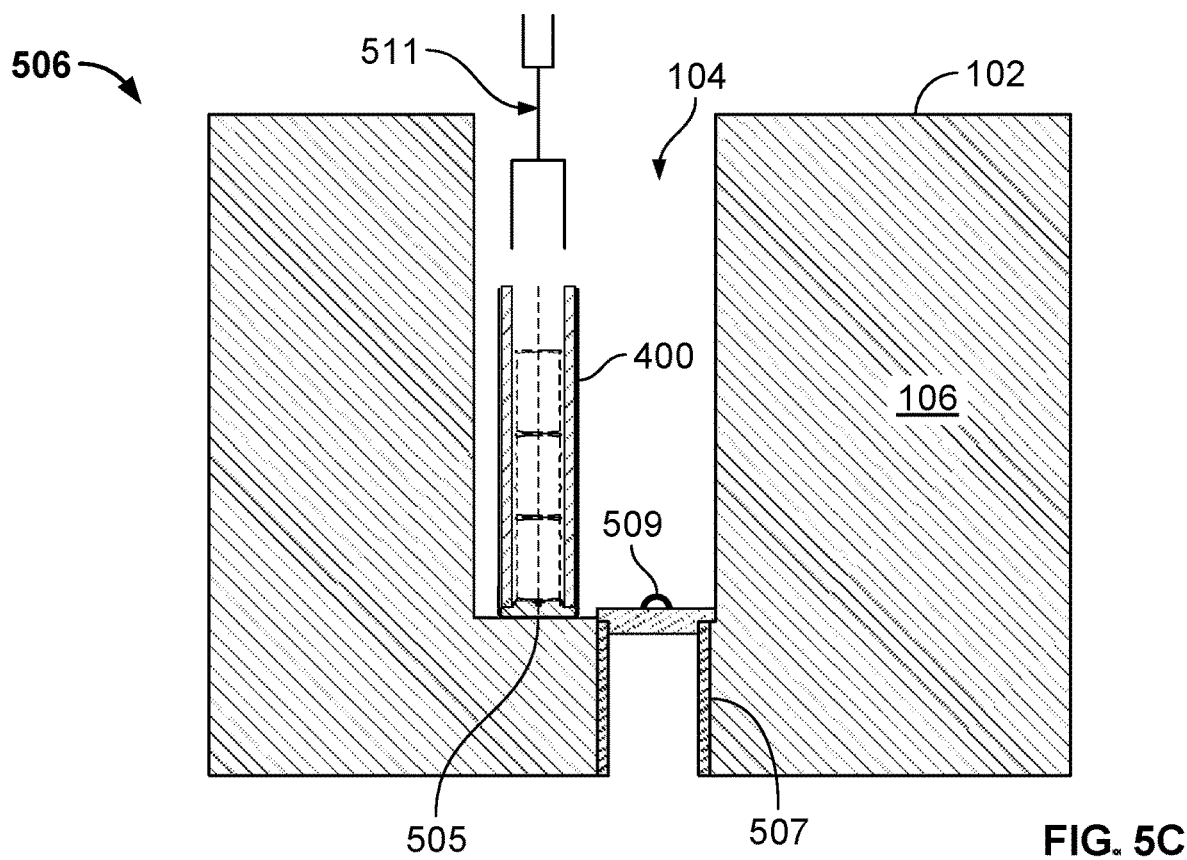

FIG. 5B shows step 504 in which a lid (or seal) 509 has been placed over the borehole 104 at the depth of the shelf 505. The lid 509 (or seal, such as a packer or bridge plug) can act as a safety measure to reduce the likelihood that something might inadvertently fall into the borehole 104. The lid 509 could be placed from above, or it could be a hinged lid 509. Its shape should be such that it cannot fall into the borehole 104 itself. FIG. 5B also shows that the lid 401 of the WIPP waste container 400 has been removed or otherwise opened to allow access to the drums 402 therewithin FIG. 5C shows a step 506 in which a set of tongs or "grabber" 511 is being lowered (e.g., on a downhole conveyance such as a wireline) to the container 400. This grabber 511 can be thin enough to slip in between the drums 402 and a housing of the container 400, and it can be tightened to get a firm grasp on the drum 402.

Figure 5D:
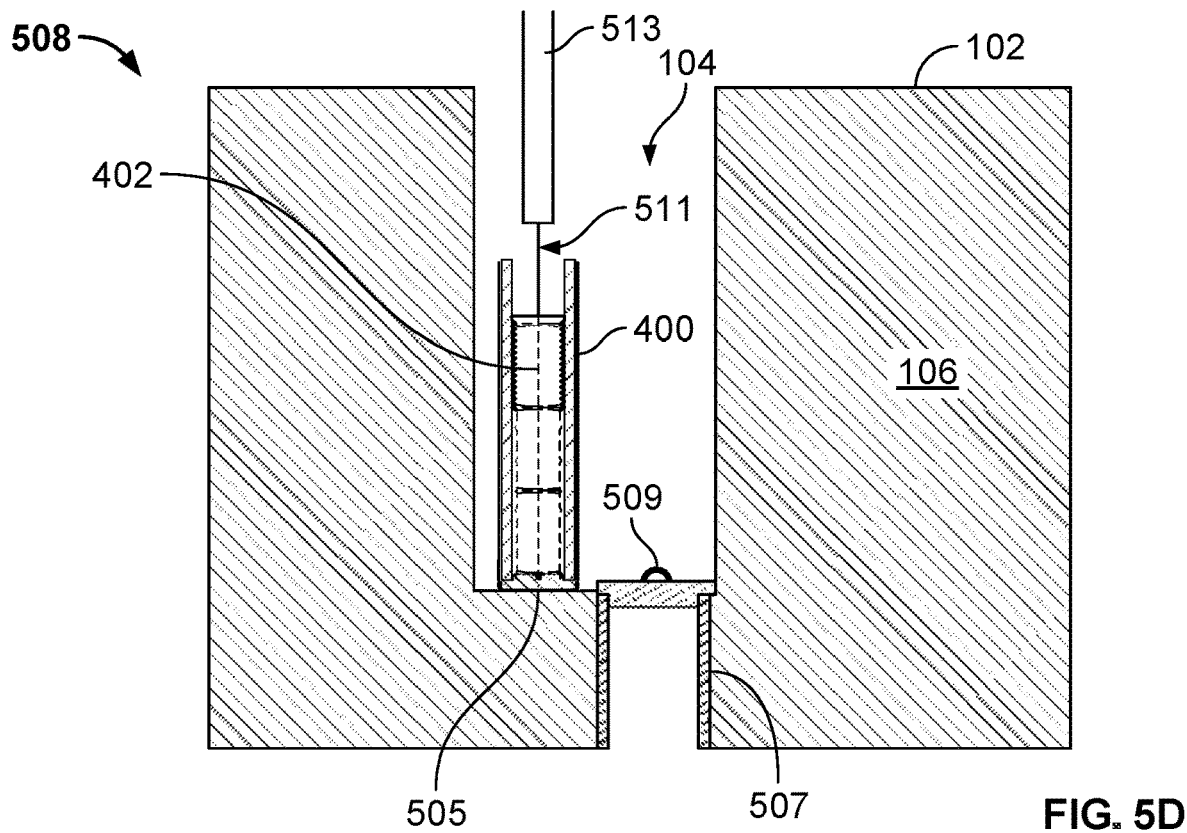

In FIG. 5D, a step 508 shows that the grabber 511 has been lowered into the container 400, and is being clamped onto the uppermost drum 402 within the container 400. The conveyance that can lift the drum 402 and remove it from the container 400, for example, can also hold or support a tractor and logging instruments (one or both, or collectively, shown as 513). The tractor 513 can be a standard oil/gas well tractor 513 that can push the drum 402 along a horizontal borehole (in the case of the borehole 104 being a directional borehole). The tractor 513 can have arms that spread out with wheels that push against the borehole 104 or casing (including casing 507) inside the borehole 104 (if casing is used). The logging device (as part of or coupled to tractor 513) can contain a variety of oil/gas instruments (such as camera, gamma logs, electrical measurement systems). The tractor/logging device 513 can also include a gamma and/or neutron shield placed on a downhole end of the tractor/logging device 513 to protect one or more logging sensors or other components from radiation emanating from the drum 402. The tractor/logging device 513 can also include a device to disengage from the drum 402 when the drum 402 is in its final position at depth within the borehole 104, such as within salt formation 110. This could be done by opening the grabber 511 to release the drum 402, but a backup method would be to have the capability of releasing the grabber 511 from the tractor/logging device 513 and leave the grabber 511 in the borehole 104.

Figure 5E:
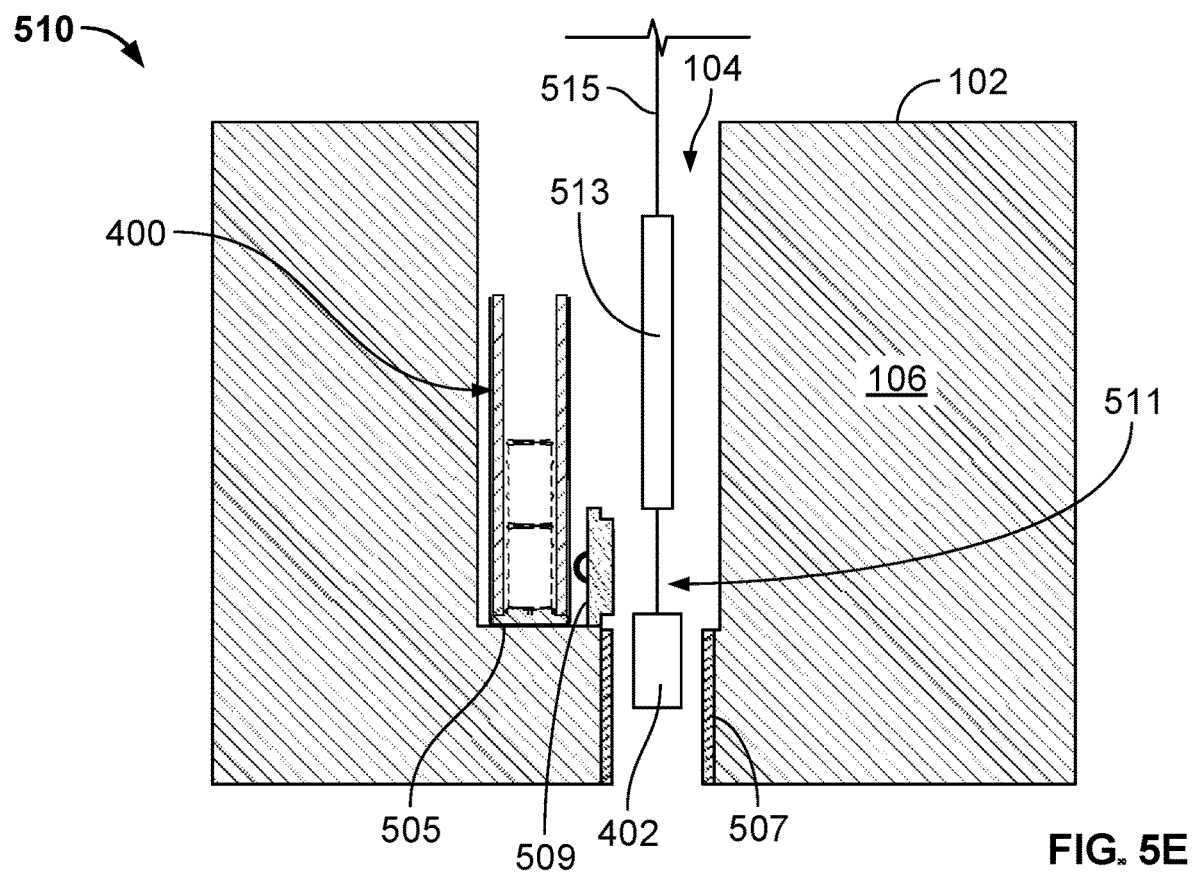

In FIG. 5E, a step 510 shows that the topmost drum 402 in the container 400 has been lifted out of the container 400, the safety lid 509 has been opened, and the drum 402 is in the process of being lowered into the cased section of the borehole 104. The casing 507 near the top, as noted, can be a conductor casing and does not go to the disposal region of the borehole 104; the conductor casing 507 can have within it other concentric casings, including a liner that is relatively thin walled (compared to the conductor casing 507) and which extends all the way to the disposal region of the borehole 104.

Figure 5F:
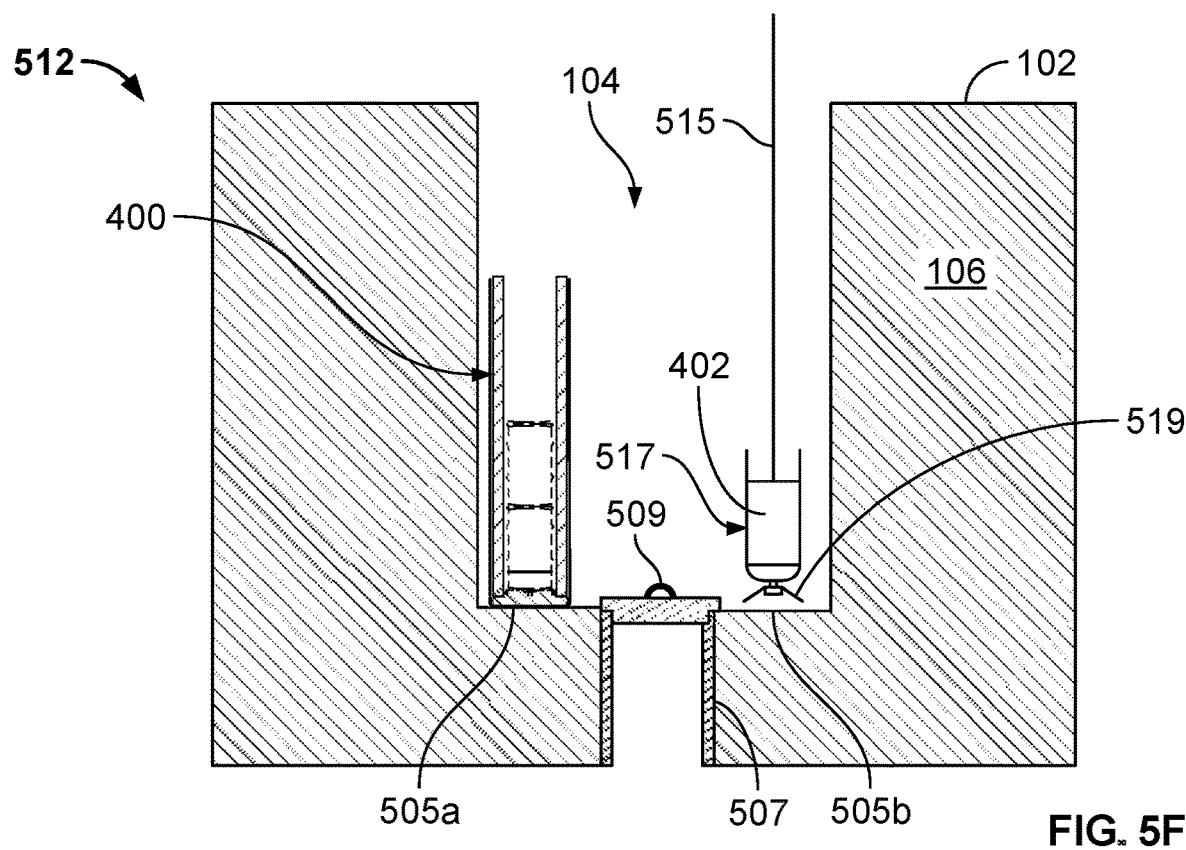

In FIG. 5F, a step 512 shows a different approach that uses two shelves 505a and 505b (or a single, donut shaped shelf that surrounds the borehole 104 downhole of the single shelf). In this example, one shelf 505a (or a portion of a single shelf) can be used to support the waste container 400, and another shelf 505b (or another portion of the single shelf) can hold or support a basket 517 that will hold a drum 402. In FIG. 5F, the grabber 511 can have already removed the top drum 402 from the container 400 and placed it the basket 517. Note that the downhole conveyance 515, in this example step, does not have a tractor or logging instruments. That is because it will not go down the borehole. In some implementations, the same conveyance 515 (such as a wireline) can be used for both the grabber 511 and for the basket 517.

The basket 517 can have a rounded or otherwise shaped bottom, to reduce the likelihood that it will get jammed when it is lowered into the borehole 104. In this example, the basket 517 can also include a measuring caliper 519 at a downhole end of the basket 517, as shown. This measuring caliper 519 can check a size (e.g., diameter) of the borehole 104 as the basket 517 is lowered, and if the borehole 104 is compressed or otherwise damaged, the caliper 519 can send a signal through the downhole conveyance 515 to stop lowering the basket 517.

In some aspects, the measuring caliper 519 can be mechanical, but it could be any one of the numerous calipers, including acoustic and optical ones. In some examples, a camera can also be installed on a downhole end of the basket 517. The camera is optional (as is the measuring caliper 519), but it can be used to observe the borehole 104 in which the basket 517 is being lowered. There can also be a light for the camera to use. The rounded bottom of the basket 517 can contain radiation shielding (such as tungsten) to protect the electronics of the caliper 519 and the camera. The camera and measurement caliper 519, in some aspects, can be sacrificial in the sense that they are not recovered from the borehole 104 after the drum 402 is emplaced.

Figure 5G:
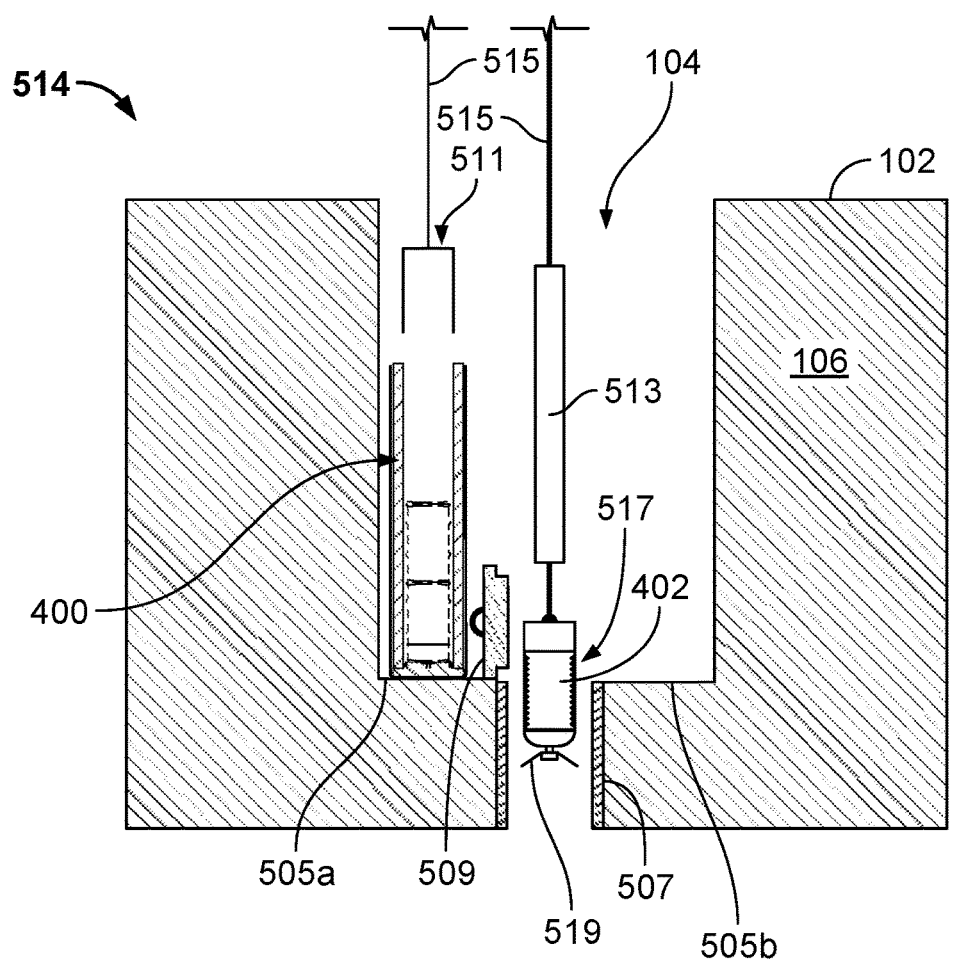

FIG. 5G shows a step 514 in which the basket 517 is held by the downhole conveyance 515, the safety lid 509 opened (it shows it opened like a door, but it could be lifted upward and removed) and the basket 517 containing the drum 402 is being lowered into the borehole 104. As before, the borehole 104 may have several concentric casings, with the lining that goes all the way to the disposal region being the innermost one. At this point, the waste (in the drum 402) has been transferred to be stored (permanently or temporarily) in the hazardous material storage region of the borehole 104. If the basket 517 has been left in the disposal region, the downhole conveyance 515 can be disconnected and withdrawn from the borehole 104. A new basket 517 can be placed on the basket shelf 505a, the safety lid 509 is closed, and the grabber 511 transfers the next drum 402 to the basket 517. The new basket 517 (and next drum 402) is then lowered into the borehole 104 and put in position as previously described. When the third drum 402 of the container 400 is put in the disposal region, the container 400 can be removed for separate disposal (it can typically go into a low-level waste repository). A new container 400 is put on the shelf 505a (or 505), the lid 509 is opened, and the procedure described with reference to these figures can be repeated.

There are many variations of this approach. For example, the shelf could be large enough to hold multiple baskets. More than one container could be place at a time. The lid of the container could be removed prior to putting the container on the platform. Once the drum is in the basket, the grabber and its cable are withdrawn (or moved to the opposite side from the basket) and a separate basket cable, complete with tractor and logging instruments, is attached to the basket. In the process it makes electrical connections with the measuring caliper and with the camera/light system.

Creating such downhole shelves as described in the present disclosure may be challenging since U.S. and many foreign countries require that the waste be retrievable for periods up to 50 years. That means the platforms must carry heavy weight yet still allow retrievability of the waste below them. Such platforms can be expensive to construct, particularly because they play a key role in safety, and therefore must meet stringent regulatory standards. This experience with vertical boreholes is yet another reason why experts practiced in the field of borehole disposal, do not consider such disposal at WIPP to be practical. There is a sense that vertical boreholes are expensive, complex, and difficult to license. These facts explain why those practiced in the field have not, in the past, proposed a separate vertical borehole facility. However, the WIPP RH-TRU waste has no retrievability requirement. Thus, vertical boreholes for WIPP RH-TRU waste disposal in vertical wellbores can be substantially less expensive than expected.

The installation and use of casings in a borehole repository can vary from repository to repository due to, for instance, geology of the subterranean zones, type of waste (and canisters) being emplaced, and other considerations, such as shape of borehole and cost. Returning to FIG. 3, in some aspects, the wellbore 104 only includes a conductor (and/or surface) casing that extends from the surface 102 at some depth, such as through subterranean formation 106 (e.g., through a formation with known sources of mobile water). In a typical operation, a casing (typically a pipe made of carbon steel) is inserted into the wellbore 104 and can extend through an entire length of the wellbore 104. There may be a series of such casings, with the largest diameter at the top (the conductor casing), next largest to cross any aquifer (the "surface" casing), and one or more casings to go deeper. For a horizontal wellbore, there needs to be a change in direction, and that means that the casing must be flexible to bend around the curve. Typical curves are 3 to 8 degrees per hundred feet. Once the casing is in place, it may be cemented in place by flowing cement down the middle of the casing, and having it take a return path towards the surface on the outside of the casing. No cement is left within the casing itself. The purpose of the casing is many-fold. The casing keeps the hole open against small rock falls within the hole. The casing prevents groundwater from entering the hole. The casing can provide a smooth surface to support instruments and smaller drill bits that are moved down the hole. The casing can keep the hole opening against rock creep that takes place in some rock, such as shale and halite, for many years.

In some aspects, however, casing provides a challenge if the diameter of the wellbore 104 is large. For large slant wells in hard rock, larger casings can be bent, usually at lower amounts (e.g., 3° per 100 feet). But (a) the thickness of the walls must be proportional to the diameter of the casing in order to support the pressure difference and (b) the force needed to flex a casing is proportional to the diameter raised to the 4th power. These challenges have prevented engineers from considering large diameter boreholes in shallow formation for radioactive waste disposal. For example, a 3° per 100 ft. curvature would curve 90° (and become horizontal) in a length along the hole of 6,000 feet, which may be too deep to allow horizontal placement of canisters in some important shallow formations.

As noted, however, some forms of nuclear waste and other hazardous materials are currently stored in canisters that are large in diameter, e.g., 24 inches or greater. An example is the RH TRU waste currently planned to be disposed at WIPP. Indeed, conventional thought is that shallow boreholes (such as borehole 104) into the salt formation at this site (e.g., around 2150 feet deep) with such a large diameter are not possible. In particular, if the well is shallow, for example, about 2000 feet, then there is not enough room to curve the casing, as described above. Large casings can (and are) used in very deep formations, particularly in deep seabed formations, but are not possible for shallow wells. Yet in some locations, a shallow well is the only acceptable site, based on having the right geologic properties.

The example wellbore 104, therefore may be drilled into the salt formation 110 and left uncased through at least a portion of its length (such as with the curved and horizontal portions left uncased at least). The example wellbore 104 may formed to a depth of about 2150 feet and a diameter of about or at least 26 inches. In some aspects, the salt formation 110 is strong and self-supporting; salt that makes a "competent" formation. Such sites can be found at the WIPP site and at other salt formations around the world.

Salt formations, such as those at WIPP and other locations, can experience "creep" as described herein. Creep in the WIPP location is only about 2% per year; that means that a cavity dug in the salt will close in about 50 years.

(Experiments show there is an initial rapid closure of 2%, possibly due to elastic expansion, not creep.) WIPP regulations do not require long-term retrievability; in fact, they regard the 50-year creep closure time as a benefit, since such closure provides a permanent sealing of the well and eliminates open paths to the surface.

In some aspects, the wellbore 104 includes a casing near the surface to isolate the hole from any aquifer (e.g., 118) found at shallow depths (less than 1000 feet deep). But in some aspects, no casing would be used below the "kickoff point" (e.g., the depth at which the hole begins to be curved). Further, with no casing, no cement would be used. In some aspects, a thin "liner" might be placed in the wellbore. The liner includes a thin pipe, similar to a casing, but with small wall thickness not designed to withstand a high-pressure difference from outside to liner to inside; and it would not be cemented in place. The purpose of the liner can be to ease the placement of the waste canisters 112, and to help the canisters 112 avoid any irregularities in the walls of the wellbore 104 that might impede the easy placement of the canisters 112.

In some aspects of the present disclosure, a casing joint (or section) used in a wellbore that includes a storage area for radioactive waste canisters (such as, but not limited to, wellbore 104) may not be threaded as is typical but instead may include other forms to allow connections to other casing joints. Such alternative forms may allow for a casing to be installed even in large diameter boreholes as described herein.

For example, as a water-tight seal between casing joints may not be needed, a threaded connection (typically between two casing joints) that provides such a tight screw seal is not needed. That means that the connections between the segments of the casing can be flexible, and that allows the casing to curve around the curved section of a large diameter borehole. A difficult change in putting in a flexible connection is that in the conventional casing practice, the casing is lowered into the hole, and the casing at the bottom must support the entire weight of the vertical and curved section of the casing. Thick casing (1-inch in thickness) can do this for lengths of casing of several kilometers or more. But even they are near the limit of strength, and making a flexible connection between casing segments (to allow the casing to curve) is extremely difficult and possibly impossible.

Figure 6:
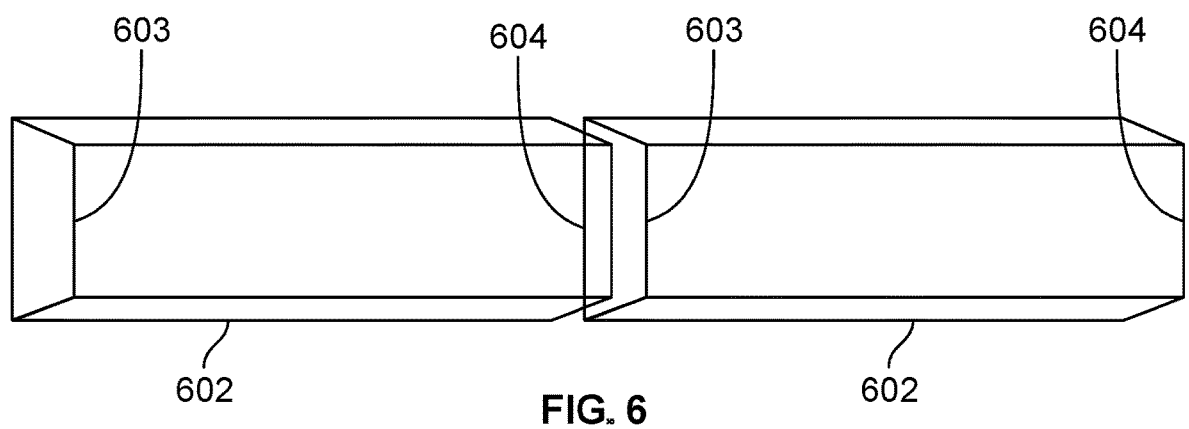
FIG. 6 is a schematic illustration of a portion of a casing that can be used in a hazardous material storage repository that includes one or more human-unoccupiable boreholes or wellbores formed from a terranean surface into a salt formation according to the present disclosure.

The present disclosure describes a casing joint with a connection (one at each end of the joint) that uses a sliding fit to connect to an adjacent joint. The ends of the casing walls are beveled, as shown in FIG. 6. The casing segments 602 can be made relatively short, e.g. 10 feet long (rather than the usual practice of making casing sections 40 feet long). Each segment will fit into the beveled end of the previous casing. Each joint includes a male beveled end 604 and a female beveled end 603.

In FIG. 6, two segments 602 of casing are shown. They slip-fit into each other, but do not lock. For purposes of illustration, assume that the casing is 1 inch thick, and that the beveled section is 2 inches long. The procedure for using this casing is as follows. After the wellbore to contain the casings and waste is drilled, one casing segment is placed above the wellbore entry (at the surface 102). It is then dropped into the wellbore, typically with the wide end (left side in FIG. 6) at the bottom. The casing segment will fall into, e.g., brine which fills the wellbore. Assuming the casing segment is made of. carbon steel, and about 1-inch thick, then calculations indicate that the terminal velocity in the hole will be between 1 and 2 meters per second. The casing segment will slide down the curved section of the wellbore, reach the end (or near the end) and come to a halt as the gravitational component along the wellbore drops to zero, but friction slows the motion. Calculations indicate that it will move into the horizontal section a distance of several meters. Then the next casing segment is dropped. (It could be dropped before the first segment comes to a halt.) When the next casing segment reaches the first casing segment, the beveled ends will fit (e.g., male into female), and the first casing segment will be pushed slightly further into the wellbore. Then the process is repeated.

Eventually some of the casing is pushed further and further into the end of the horizontal portion, but eventually the entire curved section of the wellbore can be cased in this manner. The amount of casing that fills the horizontal section may not be critical. Friction may prevent the first casing segment from reaching the end of the horizontal portion of the wellbore, but the goal, in some aspects, is not to case the entire disposal region, but to case the curved section of the borehole.

In the curved section of the borehole, the fit between segments may not be perfect. A strong curvature, e.g., of 8° per hundred feet, may mean that adjacent segments, each 10 feet long, will not be parallel but will be angled to each other by 0.8°. For a 30 inch diameter wellbore, that means that when the top of the casing is fully inserted, the bottom of the casing will be under-inserted by 30"×tan(0.8°=0.42 inches. Since this is less than the 2 inch bevel width, the two segments will partially fit, just not snugly. This is acceptable, since the casing will still provide protection from falling rocks. The gaps allow water to flow in and out of the casing, but for the application of hazardous waste (such as radioactive waste according to the present disclosure) storage, that can be acceptable.

Returning to FIG. 3, as noted, this figure shows a wellbore 104 that includes a storage portion 111 formed in a salt formation 110 for canisters 112 that enclose radioactive waste. As shown, the wellbore 104 may be only vertical or may include a non-vertical portion as well, such as the curved and horizontal portions shown in this figure. In alternative implementations, the wellbore 104 may be straight (and not include a curved or horizontal portion) but offset from generally vertical, such as a tilted wellbore 113 (shown in dashed line in FIG. 3) with a storage portion 111.

For example, a tilted wellbore 113 as shown in FIG. 3 may be less challenging to drill than are horizontal holes, and wellbores 113 allow a method of disposal that can have important advantages. In particular, vertical or tilted holes can be drilled using conventional equipment without the need to devise advanced drilling techniques to steer the large holes. As an example, consider the WIPP container shown in FIG. 4. It has a diameter of 26-inches, length of 10 feet, and can weigh up to 8 tons. It contains, typically, three "drums" that hold the highly radioactive transuranic waste. At WIPP, the waste is currently disposed in large horizontal tunnels drilled in a salt formation. For this example, the tilted wellbore 113 may be drilled into a salt formation 110 at about a depth of 2150 feet (i.e., between 1000 and 2500 feet).

In some aspects, the tilted wellbore 113 is not perpendicular to the terranean surface 102 but has a sufficiently large vertical component that gravity will cause a dropped object to fall to the bottom of the wellbore. Note that a vertical borehole is a special case of a tilted borehole, and that a tilted borehole need not be straight.

In an example process for using the tilted wellbore 113 to store, e.g., RH TRU waste, a first step is to drill a vertical or tilted borehole with a dimension larger than that of the waste container. In some aspects, a gap between the container and the borehole wall can improve safety (by reducing the free-fall velocity). In an example implementation, the diameter is made as small as is possible, without causing a danger of a container getting stuck in the hole. (A tight fit can reduce that danger by minimizing the tilt of the container relative to that of the hole during placement, but it can increase the danger of getting stuck because of a non-uniform hole or casing wall.) The wellbore can be filled with a fluid such as saturated brine that will not further dissolve the walls of the wellbore. This fluid can be the same as the drilling fluid used to cool the bit and remove drilled material.

A second step is to case the wellbore or leave it uncased, depending on the competency of the formation, e.g., on whether casing is necessary to assure a safe and secure placement of the canister at the bottom of the hole. In the preferred configuration, the wellbore can be uncased.

A third step is to inject cement into the bottom of the wellbore. The amount needed may be such that if the canister is lowered into the unhardened cement, the canister will be completely surrounded by cement. The cement should have a setting time slow enough that a canister lowered to the top of the cement will sink into the cement, but short enough that it will harden sufficiently to support an additional canister on top of it when that additional canister is placed. Other materials could be used in place of cement; what is required is a material that will allow a lowered canister to move into it and be surrounded by it, but which will then harden. Examples other than cement include concrete, epoxy mixtures and fiberglass. In the remainder of this disclosure, we will use the word "cement" to represent any such material.

A fourth step is to attach the canister to a cable to lower it into the hole. A round end piece might be attached on the bottom of the canister to make it less likely that this end of the canister will get stuck on the sides of the wellbore wall. In another configuration, the canister is placed in a basket that has a curved bottom.

A fifth step is to lower the canister into the wellbore, place it on the not-yet-set cement at the bottom, release the cable, and let the canister sink into the cement. In an example configuration, there is a sufficient quantity of the cement to completely enclose the canister. The canister could also be released after it has lowered into the cement.

A sixth step is to allow the cement to harden sufficiently that it will support the next cement load. Then steps 3-6 can be repeated until the storage portion is filled with cement and canisters. A subsequent step is to seal the upper part of the wellbore. It may also be desirable to remove the surface casing also.

This example procedure has many variations. For example, the cement could be pumped to the bottom through a pipe or tube; or the cement could be injected near the top of the borehole and have it sink to the bottom by the pull of gravity. A barrier could be placed between the top of the cement containing one canister, and the cement for the next barrier. This could be a disk, a cylinder, crushed rock, salt, fast-setting epoxy, or other object or substance that does not penetrate deeply into the cement. One goal of this barrier would be to allow the placement of a second canister and its cement before the first cement has completely set. Another purpose for this barrier could be to act as an impact limiter, a material or object that reduces the impulse of a canister that is accidentally dropped, and by reducing that impulse, reduces potential damage to the canister from the impact. The cement and/or the canister could be released before it reaches the bottom. If the space between the canister and the wall of the hole is sufficiently small (e.g., 1 to 5 cm) then the limiting velocity of a falling canister will be under a few miles per hour, and the emplacement can be done at a lower cost and more quickly than if a cable or coiled tubing or other method is used to lower the canister at a slower speed. At the lowest of the impact velocities, an impact limiter may not be necessary.

In some aspects, the cement can be put in place by placing the required amount of cement into a collapsible bag that hangs at the bottom of the container. This allows carrying the cement down at the same time that the container is placed. The amount of cement needed can be equal to the volume between the container and the wellbore. Because the space between the container and the walls is small, then the wellbore can be plugged with 600 kg of cement. Here is the calculation for the specific example: Assume that space is 1 inch, then the volume (for a 30-inch diameter hole and a 120 inch long container) is about 200 liters. For cement with density of 2.8 kg per liter, the weight is 560 kg. if we want the cement to overflow the sides and provide an additional plug at the top, then the volume of a 1-foot long 30-inch diameter cylindrical plug is 40 kg. That increases the weight of the cement to 600 kg. That is a reasonable amount for a container that weighs up to 8000 kg.

Figure 7A:
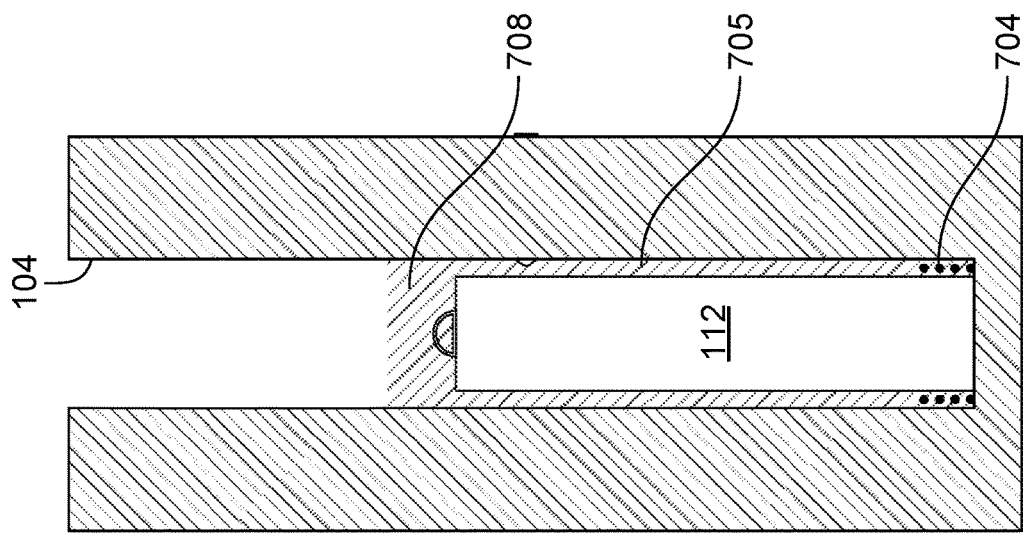
FIGS. 7A-7B are schematic illustrations of a portion of a hazardous material storage repository in which a hazardous material canister is enclosed with a hardenable material in a human-unoccupiable borehole or wellbore according to the present disclosure.
Figure 7B:
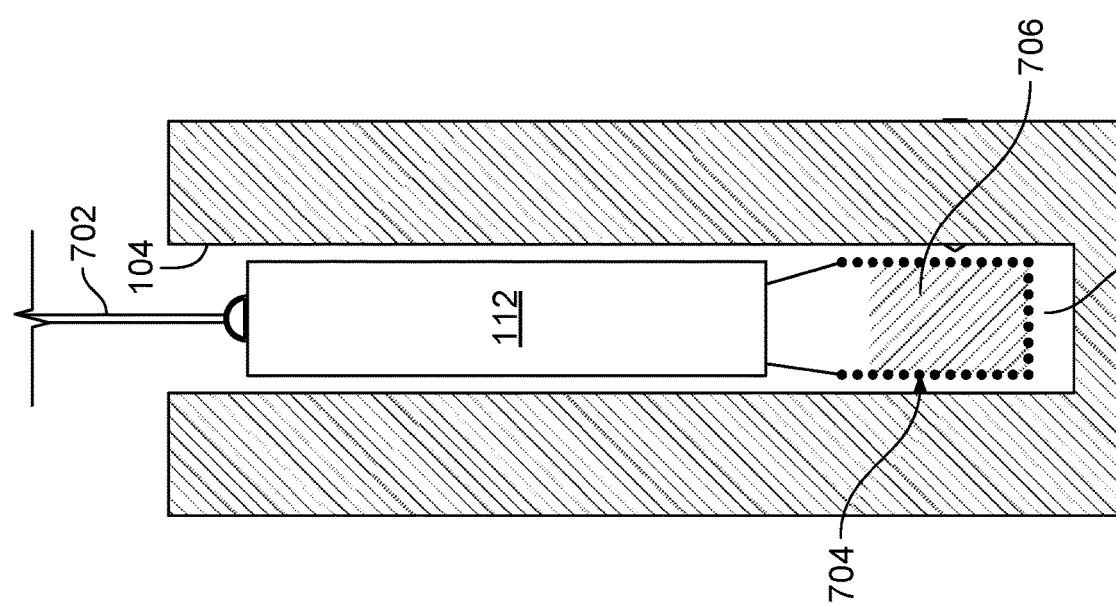

In some aspects, the cement, in liquid form, can be placed into a flexible bag that hangs below the container as shown in FIGS. 7A-7B. FIG. 7A shows the waste canister 112 being lowered into the borehole 104 (formed in a salt formation) by a downhole conveyance 702. Hanging or positioned (e.g., previously) downhole of the canister 112 is a container 704 (e.g., a flexible bag or otherwise) filled with cement 706 (or other hardenable material, such as epoxy or otherwise). As the container 704 filled with cement 706 is lowered, the container 704 settles, either on the bottom or on a previously hardened portion of cement 706, shown in FIG. 7B. The container 704 can collapse as it reaches the storage portion 111, or it could be a closed container 704 that is crushed by the weight of the canister 112 (including the contents). As the canister 112 continues to lower, the cement 706 is forced by the weight of the canister 112 (including its contents) to flow up the annulus 705 between the canister 112 and the walls of the borehole 104 (either open hole or cased). The amount of cement 706, in this example, is sufficient to overflow the height of the canister 112 and to provide a cap above the canister 112, as well as, in some aspects, providing a support surface for another container 704 with cement 706. The conveyance 702 can be released. Once the cement 706 has hardened sufficiently, the process can be continued to place a new container 704, along with its cement 706, above the first canister 112.

The container 704 as a flexible bag represents one way to deliver the cement 706 along with the container 704. There are many variations on how this can be done. The advantage of using the bag concept is that the cement 706 can be mixed and put in the bag just before the container 704 is lowered. This avoids having to have a separate process for the placement of the cement 706, followed by the placement of the canister 112.

In some aspects, the cement may rise up the sides of the canister 112 only if the weight of the canister 112 (including contents) is greater than an equal volume of cement 706; otherwise the canister 112 will float on the cement 706. For this reason, it may be necessary that the average density of the canister 112 is greater than that of the cement 706. If a canister 112 is lowered that has a lower average density than that of the cement 706, then a weight can be added to the canister 112. A weight can be put at either the top or the bottom of the canister 112. The weight can be made of a very dense material, such as lead or tungsten, so that the average density of the canister 112 plus weight exceeds that of the cement 706.

The cement 706 can contain a material that would retard the diffusive and advective transport of radionuclides. Doing this enhances the value of the cement 706 as an "engineered barrier" to the escape of hazardous radionuclides.

Figure 8:
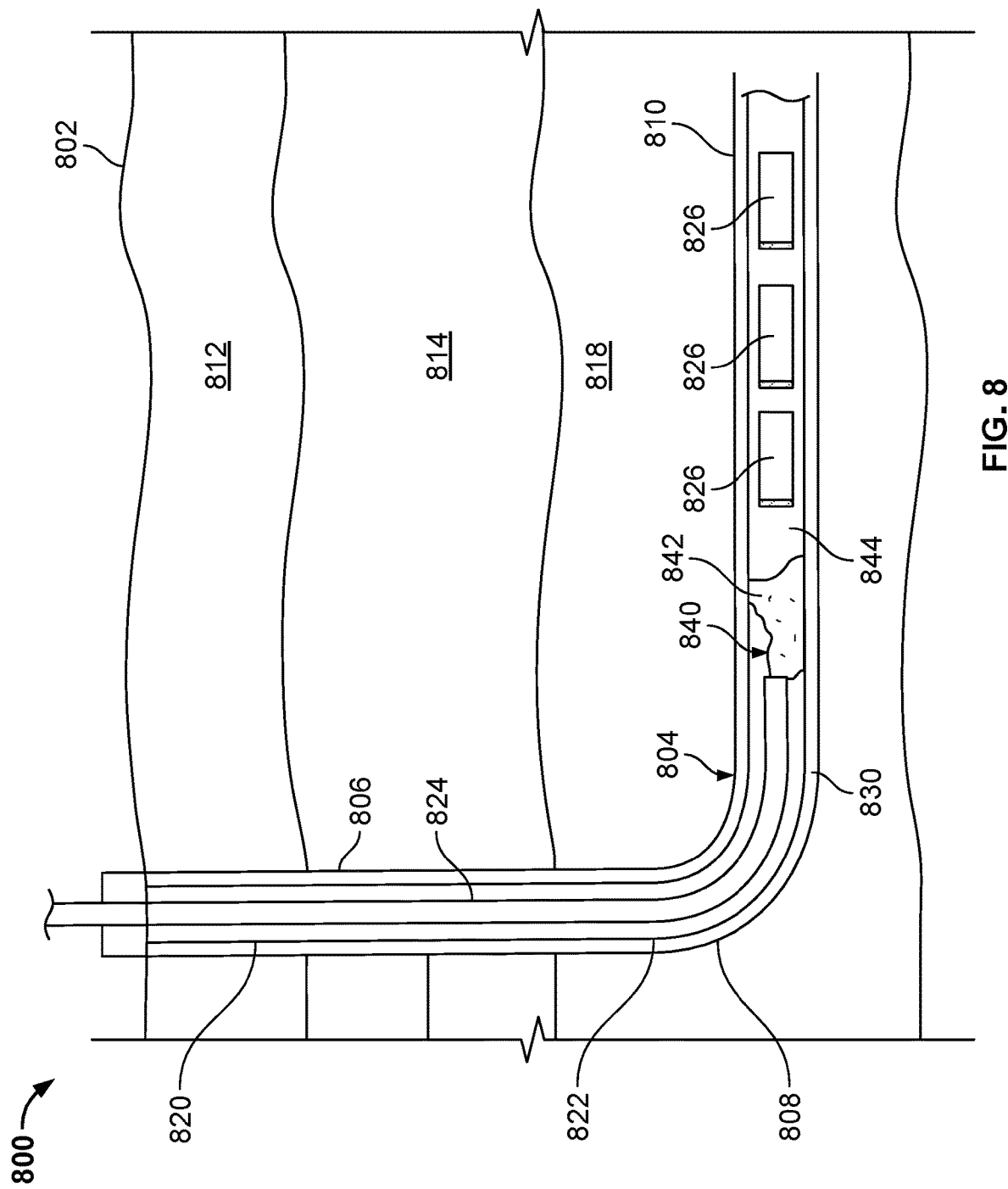
FIG. 8 is a schematic illustration of another example implementation of a hazardous material storage repository that includes one or more human-unoccupiable boreholes or wellbores formed from a terranean surface according to the present disclosure.

As noted, wellbores or boreholes according to the present disclosure (such as shown in FIG. 3 or FIG. 8) can be vertical, tilted, or a combination (e.g., vertical near the surface but then gradually tilting). Tilted wellbores have the advantage of closer spacing to other boreholes at the surface, and yet sufficient separation at depth that the danger of intersection (though borehole steering inaccuracies) may not be significant. Tilted wellbores also allow more contains to be placed in the disposal formation. For example, if the disposal formation is 1500 feet thick, and each canister including cement and possible barriers take 15 feet, then 100 canisters could be placed in a single vertical wellbore. But if the wellbore is tilted by 45°, then the length of the wellbore in the disposal formation is increased to $1500\sqrt{2}=2121$ feet, and 141 canisters could be stored. At 45°, most of the benefits of a vertical wellbore would still be valid. In addition, the tilt would slow the free-fall velocity, as would friction from the sides.

As previously described, the wellbore 104 (or 113) formed into the salt formation 110 may be constructed such that the storage portion 111 in the salt formation 110 is at between 1000 and 2500 feet TVD. Previous plans for borehole disposal have assumed, usually explicitly, depths of 1.5 to 5 km; this depth provides sufficient isolation from the surface to provide public safety. This experience with other facilities mistakenly leads those practiced in the field to dismiss a borehole at shallow depth (e.g., 1000-2500 ft.) that does not have a compelling engineered barrier. Yet WIPP itself is devoid of serious engineered barriers. The canisters at WIPP are surrounded by MgO, but this chemical does not significantly inhibit radioisotope diffusion better than does salt. The radiation levels of RH-TRU waste, however, are far below those of the nuclear reactor spent-fuel waste previously considered for disposal in wellbores formed from a terranean surface. Compared to spent-nuclear fuel (SNF), the radioactivity of WIPP RH-TRU waste is lower by, in many cases, 1/2000 per ton of waste. This significantly lower radioactivity allows a shallow hole to be considered. In the vertical borehole, there may only be 1000 feet (300 meters) of the salt formation 110 separating the waste from, for example, an aquifer in another formation (such as the Rustler formation). This is acceptable at least in part because salt has a low convection of entrained brines and the radioactivity level of RH TRU waste is 1/2000 that for SNF.

The present disclosure also describes implementations of a hazardous material storage repository that uses salt exclusive of a salt formation. As described, in some aspects, hazardous (e.g., nuclear) waste disposal in salt (even exclusive of a salt formation) can provide for the long-term disposal of such waste (such as high level nuclear material that emits alpha, gamma, and beta rays as well as neutrons). Current regulations for nuclear material typically require that the amount of such material that reaches a terranean surface must be at such a low levels that the waste will expose no human to more than 15 milli-rem (mrem) per year for the next million years.

As noted, the danger for humans comes from the possible migration of leaked waste (fluid or dissolved in fluid or otherwise) from a disposal region in an underground repository (such as a human-occupiable mined repository) to the biosphere or to the surface. Such migration can take place in two ways, both of which involve the presence of water (e.g., brine, mud) in the rock formation in which the repository is formed. The first is diffusion, i.e., the physics process in which a particle of nuclear waste (typically an ion of a radioactive isotope) moves in a random direction though the water due to collisions with the water molecules. The second mechanism is moving water, which can flow through porous media due to pressure differences. The flow rates that represent danger to flow waste to the surface can be very low: 1 millimeter per year (1 mm/y) is the same as 1 kilometer per million years.

Geologic studies have shown that a possible place to store or dispose of nuclear waste is in a deep salt formations as described with reference to FIG. 3 and others. Some of these, such as the one located near Carlsbad New Mexico, have been in place for tens of millions of years. That long-term stability in the past is adduced as evidence that long-term stability can be expected in the future. As noted, the current state-of-the-art for disposal in a mined repository in a salt formations is exemplified by the WIPP (Waste Isolation Pilot Plant) facility near Carlsbad, New Mexico. It consists of several vertical shafts that lead to a deep underground mined repository formed into the Salado salt formation, in which a complex of tunnels and rooms has been created. The rooms at Carlsbad are typically 13 feet high and 25 feet wide. They are larger than the waste container that hold the nuclear waste because placement of waste in mined repositories requires room for the underground workers and their equipment.

An accident occurred at WIPP on Feb. 14, 2014, when a radioactive container burst and leaked high level radioactive waste into the tunnels. Thirteen workers were exposed to released radioactive americium and plutonium particles. The radioactive particles spread through 900 meters of the WIPP tunnels, and escaped to the biosphere through ventilation tunnels that had been put in place to allow underground works to breathe. The WIPP facility was shut down, delaying the movement of 24,000 drums of nuclear waste from their Hanford site. The direct cost of the cleanup was estimated by the U.S. government at $640 million. The facility did not reopen until 2017.

Example implementations described in the present disclosure provide for disposal in salt formations that is less expensive to construct, more resistant to accidental release of radioactivity, is safe or safer for long-term disposal, and does not require humans underground and therefore does not require ventilation ducts.

The nuclear waste currently being disposed in mined salt repositories as well as other nuclear waste otherwise destined for non-salt repositories, and other hazardous waste, can be disposed of in a salt formation using deep, human-unoccupiable drillhole (also called boreholes herein). These disposal boreholes can be vertical or directionally drilled, such as slanted or horizontal boreholes, or other more complex shapes. The high long-term safety of a mined repository in salt is still preserved in the borehole method, but additional safety factors are added to provide for a safer disposal technique as compared to mined repositories. The preserved features include the safety of disposal in salt, the relative ease of creating the underground space (vs. doing so in rock), and the self-sealing nature of salt formations by the high creep rate of salt in the years after waste-containing rooms have been filled with waste. Added advantages for the borehole disposal of waste include lower cost (because the volume of salt removed is more efficiently utilized, increased worker safety (since no workers need ever be underground) and decreased down-time if and when an accident occurs.

Since a number of boreholes formed into a single salt formation can be modular with many separate boreholes, if something disruptive happens in one (such as canister leakage, as happened at WIPP) only one borehole is directly affected; released radioactivity would not spread as it did at WIPP. It is worth noting that the leakage at WIPP occurred with a canister that had been filled with the wrong kind of bentonite. Thus, only a small set of canisters was affected, but the entire facility had to be shut down for several years. Moreover, there are no ventilation ducts in a borehole or system of boreholes as there are at WIPP, which carry fluid-borne radiation from a deep salt formation to the surface. If an accident occurs in a drillhole, that drillhole can be sealed (e.g., with a plug or salt) and disposal of additional waste can continue at other drillholes, even into the same salt formation.

Another advantage of the borehole method is that boreholes can dispose of hazardous materials at significantly greater depth than can human-occupied tunnels, since humans need not go underground. Another advantage is that disposal need not be at a single facility (WIPP is used for waste produced from all parts of the U.S.). Rather, because boreholes are modular, the large single investment in a centralized facility is not needed. Numerous salt deposits around the world can be used to dispose of waste (nuclear and otherwise).

FIG. 8 shows an example hazardous material storage repository 800 formed into a formation 818. In some aspects, the formation 818 can be a salt formation but it is not required to be such. In the salt waste disposal method, a borehole 804 is drilled from a terranean surface 802, through a surface formation 812 (which may contain potable water), through an overburden rock 814, until the formation 818 is reached. Although shown as a directional borehole 804 with a vertical portion 806, a curved portion 808, and a horizontal portion 810, the borehole 804 can be formed as a substantially vertical borehole (only), or a slanted borehole. Then the drilling continues into the formation 818; in the case of a salt formation, other methods can be used, such as dissolution of the salt using water, to reach the disposal depth. The vertical portion 806 can be referred to as the access hole. The disposal region begins at the end of the access hole. It can be vertical or directionally drilled to be slanted, horizontal, or curved. The borehole 804 could be as small as 10 centimeters in diameter or as large as 1 meter in diameter. The waste can be placed in the hole inside canisters 826, but in some aspects, the primary purpose of the canisters 826 is for placement, not to act as an engineered barrier, since the formation 818 (and other salt as described herein) provides that barrier as well. In some instances, no canister would be used, and the waste could be put directly into the borehole 804.

If a vertical or slanted borehole 804 is used, then after placement of each canister 826, additional salt 842 can be deposited on top of that canister 826, and around the canister 826. This salt 842 serves to isolate the lower (farther down borehole 804) canister 826 from the force of the weight of the next canister 826. The salt 842 does this even while it remains in a granular form. Eventually such salt 842 is likely to coalesce into a solid block of salt from salt creep of the formation 818 (if salt) that surrounds it.

The borehole 804 could be lined or unlined. If lined, then soon after it is drilled or otherwise created, a casing 822 (a pipe, in some instances made of steel) is placed in the hole 804 in a manner similar to that used for oil and gas wellbores. This can be done while the borehole 804 is filled with fluid, which could be drilling fluid (including hydrocarbons, brine, drilling mud, or other liquid materials). In an example implementation, this fluid would be salt-saturated brine 840 that could also contain salt particles 842 to increase its density, that is, its weight per unit volume. A brine that contains salt particles can be referred to as a "brine mud," in analogy to the drilling mud used in oil and gas drilling, which consists of water mixed with rock particles.

In brine mud 840, the salt particles 842 can be small and suspended in the mud. If sodium chloride is used for the brine mud 840, then its density can approach 2.17 kg/liter. In another instance, the brine mud 840 can be made using calcium chloride instead of sodium chloride. A brine mud 840 made of calcium chloride can have a density approaching 2.71 kg/liter. Other salts could be used, such as zinc chloride (density 2.91 kg/liter) and mixture of dissolved salts can also be used.

Waste and canisters 826 carrying waste can also be placed in a borehole 804 which are not cased. To do this, preliminary tests can be made to determine the rate of closure of boreholes due to salt creep. In some instances the creep will be slow enough to allow waste to be emplaced over a period of several weeks or longer. If creep is too rapid to allow that, then the boreholes can be cased.

When the borehole 804 is filled with waste, the access hole 806 can be sealed. This can be done by removing the casing 822 (if there is casing) and filling the space with salt 842 or with brine mud 840. As the liquid in the brine mud 840 evaporates, salt crystals 842 can fill the hole. Circulation of new brine mud 840 can be used to replace brine mud 840 which has been depleted in salt with brine that is fully saturated. Alternatively, the borehole 804 can be dried and filled with dry or wet salt.

In some instances, it might be preferable to keep the casing 822 in place and seal the areas between it and the formation 818, as well as the region within the casing 822, with cement 830. The casing 822 can also have water with high salt concentrations injected between it and the formation 818, and the casing 822 itself can have a volume 844 that is filled with salt or water containing salt (including saturated brine and brine mud 840).

A clear or mostly clear brine mud 840 would allow cameras lowered before the waste is emplaced, or as the waste is being emplaced. The brine mud 840 can also provide stability by providing a hydrostatic pressure to the borehole surface to help keep it stable.

Much of the nuclear waste that is being currently being disposed in salt, and essentially all of the non-reprocessed waste from nuclear reactors, will fit in boreholes, including spent nuclear fuel that is held in nuclear reactor fuel assemblies. The waste that does not fit can be broken into smaller pieces that would fit. An example of such waste is the "corium" waste from nuclear reactor meltdown accidents such as those that took place at Chernobyl and Fukushima. The decision of whether to use a borehole for large pieces that need to be repackaged may be made based on the cost of such repackaging, or on the desire not to transport the waste by large distances.

The boreholes can be drilled using conventional oil and gas methods, or they can be drilled using the flow of water or other fluids to dissolve the salt. The hole can also be made by melting the salt with heat. Many methods of creating the hole will be known to people practiced in the art of drilling through salt.

An example implementation according to the present disclosure includes a hazardous material storage repository that includes a human-unoccupiable drillhole formed from a terranean surface into a subterranean formation, the drillhole including an access portion and a storage region positioned in the subterranean formation; a portion of hazardous waste emplaced in the storage region of the drillhole; and a portion of at least one of sodium chloride or calcium chloride emplaced with the storage region of the drillhole around the portion of hazardous waste.

In an aspect combinable with the example implementation, the subterranean formation includes a salt formation.

In another aspect combinable with any of the previous aspects, the portion of hazardous waste is enclosed in at least one hazardous waste canister.

In another aspect combinable with any of the previous aspects, wherein the portion of hazardous waste includes nuclear waste.

In another aspect combinable with any of the previous aspects, the nuclear waste includes at least one of spent nuclear fuel, high level waste, corium waste, or other radioactive waste.

In another aspect combinable with any of the previous aspects, the human-unoccupiable drillhole includes a directional drillhole.

In another aspect combinable with any of the previous aspects, the human-unoccupiable drillhole includes a vertical drillhole.

In another aspect combinable with any of the previous aspects, the human-unoccupiable drillhole includes a slant drillhole.

In another aspect combinable with any of the previous aspects, the portion of at least one of sodium chloride or calcium chloride is delivered to the storage region in a fluid.

In another aspect combinable with any of the previous aspects, the fluid includes a brine mud.

In another aspect combinable with any of the previous aspects, the fluid includes an evaporable liquid.

Another aspect combinable with any of the previous aspects further includes a casing installed between at least the storage region and the salt formation.

In another aspect combinable with any of the previous aspects, the casing is installed in the drillhole.

In another aspect combinable with any of the previous aspects, the portion of nuclear waste is enclosed in a plurality of nuclear waste canisters.

In another aspect combinable with any of the previous aspects, the portion of at least one of sodium chloride or calcium chloride is emplaced within the storage region of the drillhole to fill a volume between the salt formation and the plurality of nuclear waste canisters.

In another example implementation, a method for storing hazardous material includes identifying a hazardous material storage repository that includes a human-unoccupiable drillhole formed from a terranean surface into a subterranean formation, the drillhole including an access portion and a storage region positioned in the subterranean formation; emplacing a portion of hazardous waste in the storage region of the drillhole; and emplacing a portion of at least one of sodium chloride or calcium chloride in the storage region of the drillhole around the portion of hazardous waste.

An aspect combinable with the another example implementation further includes operating the hazardous material storage repository.

Another aspect combinable with any of the previous aspects of the another example implementation further includes forming the human-unoccupiable drillhole.

In an aspect combinable with any of the previous aspects of the another example implementation, forming includes drilling through the salt formation or dissolving a portion of the salt formation.

Another aspect combinable with any of the previous aspects of the another example implementation further includes circulating the fluid that includes the at least one of sodium chloride or calcium chloride into the storage region.

Another aspect combinable with any of the previous aspects of the another example implementation further includes sealing the drillhole.

In an aspect combinable with any of the previous aspects of the another example implementation, sealing the drillhole includes sealing the drillhole with the salt formation through creep.

In an aspect combinable with any of the previous aspects of the another example implementation, sealing the drillhole includes sealing the drillhole with a drillhole plug.

In an aspect combinable with any of the previous aspects of the another example implementation, sealing the drillhole includes sealing the drillhole with the sodium chloride through creep.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

A number of implementations have been described. Nevertheless, it will be understood that various modifications may be made without departing from the spirit and scope of the disclosure. For example, example operations, methods, or processes described herein may include more steps or fewer steps than those described. Further, the steps in such example operations, methods, or processes may be performed in different successions than that described or illustrated in the figures. Accordingly, other implementations are within the scope of the following claims.

What is claimed is:

1. A hazardous material storage repository, comprising:
a borehole that extends into the Earth from a terranean surface, the borehole comprising a first portion that comprises an entry at the terranean surface that extends a first depth from the terranean surface, a second portion that extends from the first portion into a subterranean salt formation, and a hazardous material storage borehole portion formed in the subterranean salt formation, the first portion larger than the second portion;
at least one storage canister positioned in the hazardous material storage borehole portion, the storage canister sized to fit from the borehole entry through a substantially vertical borehole portion of the borehole, and into the hazardous material storage borehole portion of the borehole, the at least one storage canister comprising an inner cavity sized to enclose nuclear waste material that comprises TRansUranic (TRU) waste that comprises transuranic radioisotopes;
a seal positioned in the borehole, the seal isolating the hazardous material storage borehole portion of the borehole from the entry of the borehole; and
a shelf formed within the borehole and at an interface between the first portion and the second portion, the shelf sized to support a TRU waste container configured to enclose a plurality of storage canisters including the at least one storage canister.

2. The hazardous material storage repository of claim 1, wherein the hazardous material storage borehole portion is between 1000 feet and 2500 feet below the terranean surface.

3. The hazardous material storage repository of claim 1, wherein the second portion of the borehole comprises a diameter of at least 26 inches.

4. The hazardous material storage repository of claim 3, wherein the first portion of the borehole comprises a diameter of greater than 26 inches.

5. The hazardous material storage repository of claim 1, wherein the second portion of the borehole further comprises a non-vertical borehole portion.

6. The hazardous material storage repository of claim 5, wherein the non-vertical borehole portion comprises a tilted, curved or horizontal borehole portion.

7. The hazardous material storage repository of claim 1, wherein the first portion of the borehole is uncased.

8. The hazardous material storage repository of claim 1, further comprising:
a casing installed in the second portion of the borehole; and
a cement layer installed adjacent the casing.

9. The hazardous material storage repository of claim 8, wherein the casing comprises a plurality of casing segments, each of the casing segments comprising a male beveled end and a female beveled end.

10. The hazardous material storage repository of claim 1, wherein each of the plurality of storage canisters is positioned within a hardenable material placed in the hazardous material storage borehole portion.

11. The hazardous material storage repository of claim 10, wherein the hardenable material comprises cement or concrete.

12. The hazardous material storage repository of claim 10, wherein the hardenable material is placed in the hazardous material storage borehole portion with one or more flexible enclosures.

13. The hazardous material storage repository of claim 1, wherein the second portion is formed as a ring at the interface of the first portion of the borehole and the second portion of the borehole.

14. The hazardous material storage repository of claim 13, wherein the ring is sized to support the TRU waste container and at least one of the plurality of storage canisters.

15. The hazardous material storage repository of claim 1, further comprising an adjustable lid installed at the interface of the first portion of the borehole and the second portion of the borehole adjacent the shelf.

16. The hazardous material storage repository of claim 1, wherein the nuclear waste material is transferred from the TRU waste container supported on the shelf to the at least one storage canister and into the second portion of the borehole.

17. The hazardous material storage repository of claim 16, wherein the at least one storage canister is a drum enclosed in and taken from the TRU waste container.

18. The hazardous material storage repository of claim 1, wherein the seal is placed at the entry of the second portion of the borehole.

19. The hazardous material storage repository of claim 1, wherein the TRU waste comprises remote handled TRU waste.

20. The hazardous material storage repository of claim 1, wherein the first portion is larger in diameter than the second portion.

* * * * *